(12) United States Patent
Borinato et al.

(10) Patent No.: US 9,276,419 B2
(45) Date of Patent: Mar. 1, 2016

(54) ROBOT, A DOCKING SYSTEM AND A DOCKING METHOD

(75) Inventors: Gianni Borinato, Schio (IT); Jiaofeng Tian, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 149 days.

(21) Appl. No.: 13/996,394

(22) PCT Filed: Dec. 20, 2011

(86) PCT No.: PCT/CN2011/002139
§ 371 (c)(1),
(2), (4) Date: Oct. 1, 2013

(87) PCT Pub. No.: WO2012/083589
PCT Pub. Date: Jun. 28, 2012

(65) Prior Publication Data
US 2014/0031979 A1  Jan. 30, 2014

(30) Foreign Application Priority Data

Dec. 20, 2010 (CN) .......................... 2010 1 0599391
Dec. 20, 2010 (CN) .......................... 2010 1 0599394
Dec. 20, 2010 (CN) .......................... 2010 1 0599403
Jun. 30, 2011 (CN) .......................... 2011 1 0182003

(51) Int. Cl.
*H02J 7/00* (2006.01)
*G05D 1/02* (2006.01)
(Continued)

(52) U.S. Cl.
CPC ............. *H02J 7/0027* (2013.01); *A01D 34/008* (2013.01); *A47L 9/2873* (2013.01);
(Continued)

(58) Field of Classification Search
USPC ............................................................ 901/1
See application file for complete search history.

(56) References Cited

U.S. PATENT DOCUMENTS 5,838,142 A * 11/1998 Wyss et al. .................... 320/148
6,586,908 B2 * 7/2003 Petersson et al. ............. 320/107
(Continued)

FOREIGN PATENT DOCUMENTS

CN        1743147 A     3/2006
CN        1751650 A     3/2006
(Continued)

*Primary Examiner* — Jason Holloway
(74) *Attorney, Agent, or Firm* — Knobbe, Martens, Olson & Bear, LLP

(57) ABSTRACT

The present invention refers to a robot, a docking system and a docking method therefor. The docking system comprises a first circuit located in a robot. The first circuit comprises a power storage unit for supplying power to the robot and a first main control unit for controlling the movement of the robot. The docking system further comprises a first group of terminals electrically connected with the first circuit, and a second circuit located in a docking station. The second circuit comprises a power supplying unit. The docking system further comprises a second group of terminals electrically connected with the second circuit. The power storage unit or the power supplying unit provides a detection power. The detection power generates a detection current when it flows across a detection circuit. The detection circuit is constructed by the first circuit and the second circuit through the first group of terminals docking with the second group of terminals. The detection circuit further comprises a current detection unit, and the first main control unit confirms that the first group of terminals dock with the second group of terminals when the detection current is detected by the current detection unit. The robot according to this invention can reliably dock to the docking station without human intervention, which brings extreme convenience to production and life.

20 Claims, 13 Drawing Sheets

(51) Int. Cl.
   *A01D 34/00*  (2006.01)
   *H02J 7/04*   (2006.01)
   *A47L 9/28*   (2006.01)
   *B25J 9/00*   (2006.01)

(52) U.S. Cl.
   CPC ............ *G05D1/0225* (2013.01); *H02J 7/0036* (2013.01); *H02J 7/045* (2013.01); *A47L 2201/02* (2013.01); *A47L 2201/022* (2013.01); *B25J 9/0003* (2013.01); *G05D 2201/0208* (2013.01); *Y02T 90/125* (2013.01); *Y10S 901/01* (2013.01)

(56) References Cited

U.S. PATENT DOCUMENTS

| | | | |
|---|---|---|---|
| 6,748,297 B2 | 6/2004 | Song et al. | |
| 6,888,338 B1 | 5/2005 | Bucur et al. | |
| 7,729,801 B2 | 6/2010 | Abramson | |
| 8,572,799 B2 * | 11/2013 | Won et al. | 15/319 |
| 8,749,196 B2 * | 6/2014 | Cohen et al. | 320/109 |
| 2004/0088081 A1 | 5/2004 | Lee et al. | |
| 2006/0043930 A1 | 3/2006 | Koyanagi et al. | |
| 2006/0087273 A1 | 4/2006 | Ko et al. | |
| 2007/0114975 A1 * | 5/2007 | Cohen et al. | 320/149 |
| 2007/0142964 A1 * | 6/2007 | Abramson | 700/245 |
| 2007/0226949 A1 * | 10/2007 | Hahm et al. | 15/340.1 |
| 2007/0267998 A1 | 11/2007 | Cohen et al. | |
| 2008/0007203 A1 | 1/2008 | Cohen et al. | |
| 2008/0174268 A1 * | 7/2008 | Koo et al. | 320/109 |
| 2010/0064974 A1 | 3/2010 | Ally et al. | |
| 2010/0324736 A1 * | 12/2010 | Yoo et al. | 700/259 |
| 2011/0238214 A1 * | 9/2011 | Yoo et al. | 700/258 |

FOREIGN PATENT DOCUMENTS

| | | |
|---|---|---|
| CN | 1768683 A | 5/2006 |
| CN | 1899184 A | 1/2007 |
| CN | 101375781 A | 3/2009 |
| CN | 101648377 A | 2/2010 |
| EP | 1721279 B1 | 11/2009 |
| WO | 2012/045524 A2 | 4/2012 |

* cited by examiner

ROBOT, A DOCKING SYSTEM AND A DOCKING METHOD

CROSS-REFERENCE TO RELATED APPLICATIONS

This application is the U.S. National Phase under 35. U.S.C. §371 of International Application PCT/CN2011/002139, filed Dec. 20, 2011, which claims priority to Chinese Patent Application No. 201010599391.5, filed Dec. 20, 2010, Chinese Patent Application No. 201010599403.4, filed Dec. 20, 2010, Chinese Patent Application No. 201010599394.9, filed Dec. 20, 2010, and Chinese Patent Application No. 201110182003.8, filed Jun. 30, 2011. The disclosures of the above-described applications are hereby incorporated by reference in their entirety. The International Application was published under PCT Article 21(2) in a language other than English.

TECHNICAL FIELD

The invention relates to a robot.
The invention also relates to a docking system consisting of a robot and a docking station.
The invention also relates to a method for automatic docking of a robot and a docking station.

BACKGROUND

Along with the development of scientific technology, intelligent robots have become known to people. The robots can implement the related predetermined tasks without manual operation and interference according to the predetermined programs, and therefore are widely applied to industrial and household products; such as robots conducting various functions, lawn mowers, and dust collectors. The intelligent robots greatly save time for people and bring great convenience to industrial production and household living. Those robots adopt a power storage unit to supply power, but when the power in the power storage unit is exhausted, they cannot work. At this moment, people have to move the robots to the docking station to supplement power. In some circumstances, power supplementation may cost several hours, so people have to wait for several hours before re-starting the robots and having it work continuously.

To overcome the mentioned problems, a system and a method for automatic docking of the robots and docking station must be developed.

SUMMARY

The present invention provides a docking system for a robot to dock with a docking station. the docking system comprises: a first circuit located in a robot, the first circuit comprising a power storage unit for supplying power to the robot and a first main control unit for controlling the movement of the robot; a first group of terminals electrically connected with the first circuit; a second circuit located in a docking station, the second circuit comprising a power supplying unit; and a second group of terminals electrically connected with the second circuit, the power storage unit or the power supplying unit providing a detection power, the detection power generating a detection current when it flows across a detection circuit, the detection circuit being constructed by the first circuit and the second circuit through the first group of terminals docking with the second group of terminals; the detection circuit further comprises a current detection unit, and the first main control unit confirms that the first group of terminals dock with the second group of terminals when the detection current is detected by the current detection unit.

Preferably, the detection power is provided by the power supplying unit.

Preferably, the power provided by the supplying unit is a charging power, and the detection power is equal to the charging power.

Preferably, the power provided by the power supplying unit is a non-charging power, and the detection power is equal to the non-charging power.

Preferably, the voltage of the non-charging power is less than 12V.

Preferably, the detection power is provided by the power storage unit, a non-charging power is provided by the power supplying unit, and the detection power is higher than the non-charging power.

Preferably, the second circuit further comprises a second main control unit, and the second main control unit confirms that the first group of terminals dock with the second group of terminals when the detection current is detected by the current detection unit.

Preferably, the second main control unit controls the power supplying unit to output a charging power after the first group of terminals dock with the second group of terminals.

Preferably, the second main control unit controls the power supplying unit to output a charging power if the detection current is detected by the current detection unit again during a predetermined period after the first group of terminals dock with the second group of terminals.

Preferably, the current detection unit comprises a first current detection unit in the first circuit and a second current detection unit in the second circuit, the first main control unit controls the robot to move according to the signal transmitting from the first current detection unit, and the second main control unit controls the power supplying unit to output power according to the signal transmitting from the second current detection unit.

Preferably, the first circuit further comprises a switch module, and the first main control unit controls the switch module to isolate the power storage unit from the other part of the detection circuit if the detection current is not detected by the current detection unit.

Preferably, the first main control unit controls the robot to stop after the first group of terminals dock with the second group of terminals.

Preferably, the first main control unit controls the robot to move if the detection current is not detected by the current detection again during a predetermined period after the robot stops.

Preferably, the robot further comprises a storage power detection unit, and the first main control unit controls the robot to return to the docking station according to the signal transmitting from the storage power detection unit when the storage power detection unit detects that the present power of the power storage unit is less than a predetermined power value.

Preferably, the robot further comprises a forced return assembly, and the first main control unit controls the robot to return to the docking station when the forced return assembly sends a return instruction to the first main control unit.

Preferably, the first main control unit detects the working time of the robot and controls the robot to return to the docking station when the working time reaches a predetermined value.

Preferably, the docking system further comprising a boundary wire, the docking station is connected with the boundary wire, and the robot returns to the docking station along the boundary wire.

Preferably, the first group of terminals comprise a first terminal and a second terminal for receiving a charging power provided by the power supplying unit, and the robot further comprises a rectifying unit disposed between the first terminal and the second terminal, the rectifying unit comprising a positive input terminal, a negative input terminal, a positive output terminal and a negative output terminal, the positive input terminal electrically connected with the first terminal, the negative input terminal electrically connected with the second terminal, the positive output terminal electrically connected with the positive terminal of the power storage unit, the negative output terminal electrically connected with the negative terminal of the power storage unit.

Preferably, the robot is a mower and comprises a cutting assembly for mowing a lawn.

The present invention also provides a docking method for a robot to dock with a docking station. the robot comprising: a first group of terminals; and a first circuit electrically connected with the first group of terminals, the first circuit comprising a power storage unit for supplying power to the robot and a first main control unit for controlling the robot to move; the docking station comprising: a second group of terminals operable to electrically connect with the first group of terminals respectively; and a second circuit electrically connected with the first group of terminals, the second circuit comprising a power supplying unit; the power storage unit or the power supplying unit providing a detection power, the detection power generating a detection current when it flows across a detection circuit, the detection circuit constructed by the first circuit and the second circuit through the first group of terminals docking with the second group of terminals, the detection circuit further comprising a current detection unit; the docking method comprising the following steps: the current detection unit detecting a current in the detection circuit; the first main control unit confirming whether the detection current is detected by the current detection unit; the detection current being detected by the current detection unit; the first main control unit confirming that the first group of terminals dock with the second group of terminals.

Preferably, the current detection unit is disposed in the first circuit.

Preferably, a detection power is provided by the power supplying unit, the detection power is a charging power.

Preferably, the first main control unit controls the robot to stop after the first group of terminals dock with the second group of terminals.

Preferably, the first main control unit controls the robot to move if the detection current is not detected by the current detection unit again during a predetermined period after the robot stops.

Preferably, the robot further comprises a storage power detection unit, and the first main control unit controls the robot to return to the docking station according to the signal transmitting from the storage power detection unit when the storage power detection unit detects that the present power of the power storage unit is less than a predetermined power value.

Preferably, the robot further comprises a forced return assembly, the first main control unit controls the robot to return to the docking station when the forced return assembly sends a return instruction to the first main control unit.

Preferably, the first main control unit detects the working time of the robot and controls the robot to return to the docking station when the working time reaches a predetermined value.

Preferably, the first group of terminals comprise a first terminal and a second terminal for receiving a charging power provided by the power supplying unit, and the robot further comprises a rectifying unit disposed between the first terminal and the second terminal, the rectifying unit comprising a positive input terminal, a negative input terminal, a positive output terminal and a negative output terminal, the positive input terminal electrically connected with the first terminal, the negative input terminal electrically connected with the second terminal, the positive output terminal electrically connected with the positive terminal of the power storage unit, the negative output terminal electrically connected with the negative terminal of the power storage unit.

The present invention also provides a robot operable to dock with a docking station and obtain power from the docking station, the robot comprising: a first group of terminals; a first circuit electrically connected with the first group of terminals, the first circuit comprising a power storage unit for supplying power to the robot and a first main control unit for controlling the robot to move; the docking station comprising: a second group of terminals operable to electrically connect with the first group of terminals respectively; a second circuit electrically connected with the first group of terminals, the second circuit comprising a power supplying unit; the power storage unit or the power supplying unit providing a detection power, the detection power generating a detection current when it flows across a detection circuit, the detection circuit constructed by the first circuit and the second circuit through the first group of terminals docking with the second group of terminals; the detection circuit further comprises a current detection unit, and the first main control unit confirms that the first group of terminals docks with the second group of terminals when the detection current is detected by the current detection unit.

Preferably, the current detection unit is disposed in the first circuit.

Preferably, the power provided by the power supplying unit is a detection power, the detection power is a charging power.

Preferably, the first main control unit controls the robot to stop after the first group of terminals dock with the second group of terminals.

Preferably, the first main control unit controls the robot to move if the detection current is not detected by the current detection unit again during a predetermined period after the robot stops.

Preferably, the robot further comprises a storage power detection unit, and the first main control unit controls the robot to return to the docking station according to the signal transmitting from the storage power detection unit when the storage power detection unit detects that the present power of the power storage unit is less than a predetermined power value.

Preferably, the robot further comprises a forced return assembly, the first main control unit controls the robot to return to the docking station when the forced return assembly sends a return instruction to the first main control unit.

Preferably, the first main control unit detects the working time of the robot and controls the robot to return to the docking station when the working time reaches a predetermined value.

Preferably, the first group of terminals comprise a first terminal and a second terminal for receiving a charging power provided by the power supplying unit, and the robot further comprises a rectifying unit disposed between the first terminal and the second terminal, the rectifying unit comprising a positive input terminal, a negative input terminal, a positive output terminal and a negative output terminal, the positive input terminal electrically connected with the first terminal, the negative input terminal electrically connected with the second terminal, the positive output terminal electrically connected with the positive terminal of the power storage unit, the negative output terminal electrically connected with the negative terminal of the power storage unit.

The beneficial benefit of the present invention is that the robot can reliably dock to the docking station without human intervention, which brings extreme convenience to production and life.

BRIEF DESCRIPTION OF THE DRAWINGS

The mentioned technical problems, technical scheme, and beneficial benefits can be obtained through the detailed embodiments of the present invention with the following attached drawings.

The marked numbers and symbols in the attached drawings and description are used for representing identical or equivalent components.

| 10 | docking station |
| 12 | power wire |
| 14 | the second circuit |
| 16 | the third terminal |
| 18 | the fourth terminal |
| 20, 20', 20" | power supplying unit |
| 26, 26' | the second current detection unit |
| 28, 28' | the second main control unit |
| 30, 30' | output power detection unit |
| 50 | robot |
| 52 | motor |
| 54 | wheel |
| 56 | power storage unit |
| 58 | the first circuit |
| 60 | the first terminal |
| 62 | the second terminal |

-continued

| 72" | rectifying unit |
| 76, 76', 76" | the first main control unit |
| 78, 78' | across circuit |
| 80, 80', 80" | the first current detection unit |
| 82, 82', 82" | storage power detection unit |
| 88, 88', 88" | switch module |
| 90 | forced return assembly |
| 92 | rain detection unit |
| 100 | boundary wire |
| 102 | working area |

DETAILED DESCRIPTION OF THE INVENTION

The following are the detailed descriptions and technical contents of the present invention with reference to the attached drawings. However, the drawings are intended for reference only and should not be regarded as the limit of the present invention.

Figure 1:
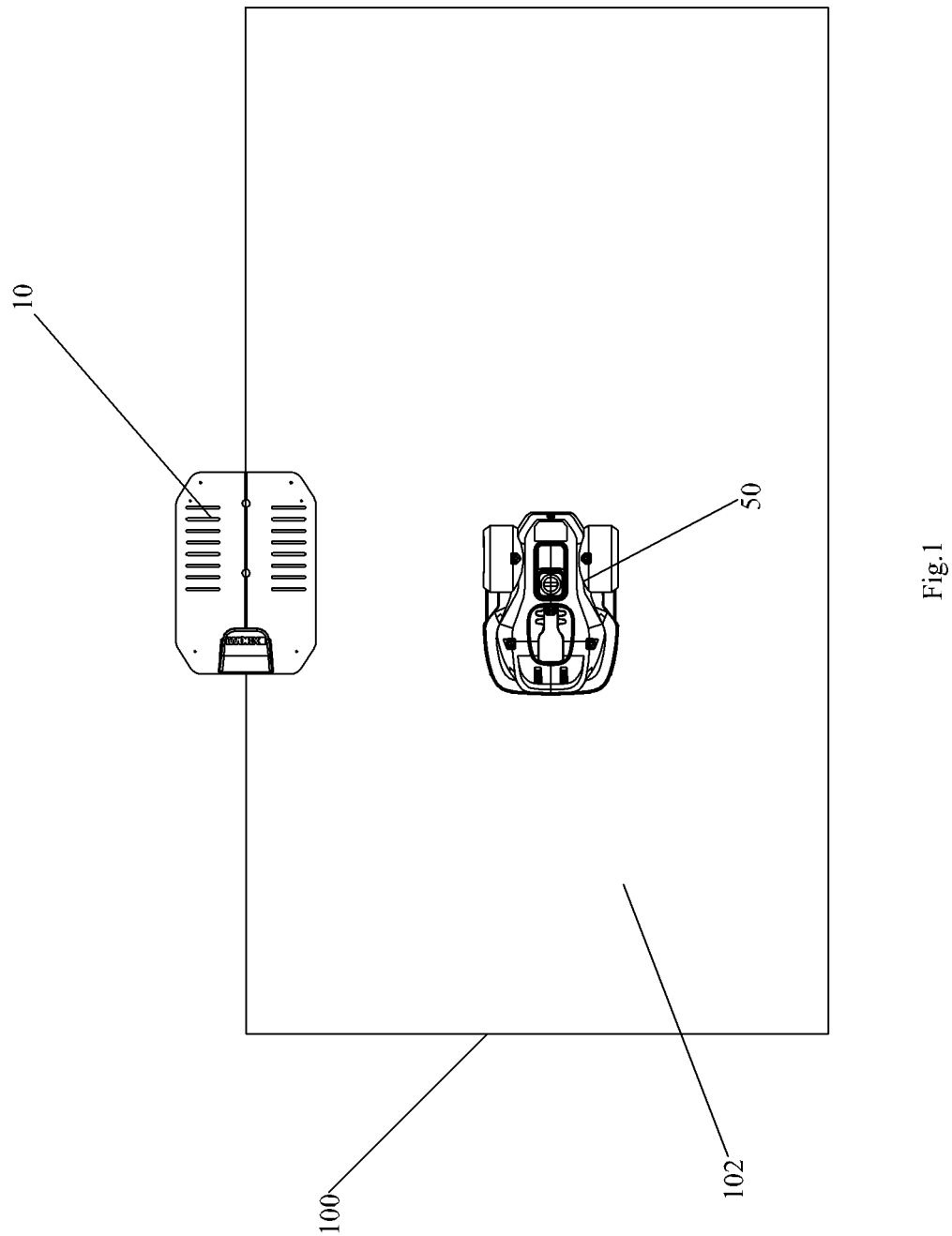
FIG. 1 is a schematic view of the robot and the docking station in the preferable embodiment of the present invention.

FIG. 1 shows a docking system comprising a docking station 10 and a robot 50. The system further comprises a boundary wire 100 configured for defining a working area 102. The docking station 10 is located on the boundary wire 100. The robot 50 moves automatically in the working area 102 defined by the boundary wire 100 and works in the working area 102 according to the preset program. When requiring power, completing work, exceeding the working time, or detecting rain, the robot 50 returns to the docking station 10 along the boundary wire 100 to try to dock with the docking station 10. Once the robot 50 docked with the docking station 10, the robot 50 stops moving, and the docking station 10 is started to charge the robot 50. If the docking system, comprising the docking station 10 and the robot 50, does not include the boundary wire 100, the robot 50 is guided by signals to work and return. Thus, the robot 50 returns to the docking station 10 along the boundary constituted by the signals. The two ways, namely returning along the boundary wire and returning through the guided signals, are identical in modes of confirming docking, being started to charge and stopping charging, but different only in the mode of guiding the robot 50 to return to the docking station 10. Therefore, the present invention only uses the method where the robot 50 returns to the docking station 10 along the boundary wire 100 as an example to describe the docking and charging between the docking station 10 and the robot 50.

Figure 2:
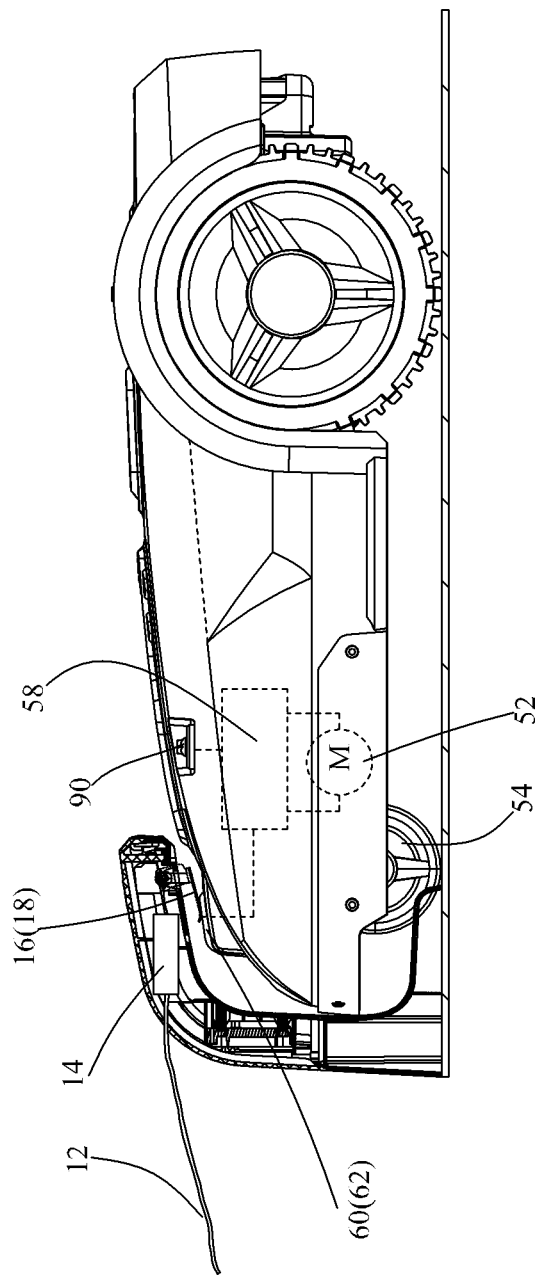
FIG. 2 is a schematic view of docking between the robot and the docking station as shown in FIG. 1.

As shown in FIG. 2, the docking station 10 comprises a power wire 12, a second circuit 14 electrically connected with the power wire 12, and a second group of terminals connected with the output end of the second circuit 14. The second group of terminals at least comprises a third terminal 16 and a fourth terminal 18 (the first third terminal 16 and the fourth terminal 18 look like they are overlapped in the figure because of the angle of view). The robot 50 comprises a first group of terminals, a first circuit 58 electrically connected with the first group of terminals, and a traveling mechanism under the control of the first circuit 58, wherein the first group of terminals at least comprises a first terminal 60 and a second terminal 62 (the first terminal 60 and the second terminal 62 look like they are overlapped in the figure because of the angle of view). The first group of terminals of the robot 50 is correspondingly electrically connected with the second group of terminals of the docking station 10 while the robot 50 docked with the docking station 10. The traveling mechanism further comprises a motor 52 and wheels 54 driven by the motor 52. The traveling mechanism drives the robot 50 to return to the docking station 10 to try to dock with the docking station 10 when the robot 50 requires power.

The first preferable embodiment of the present invention is described in further detail with reference to FIGS. 3-5.

Figure 3:
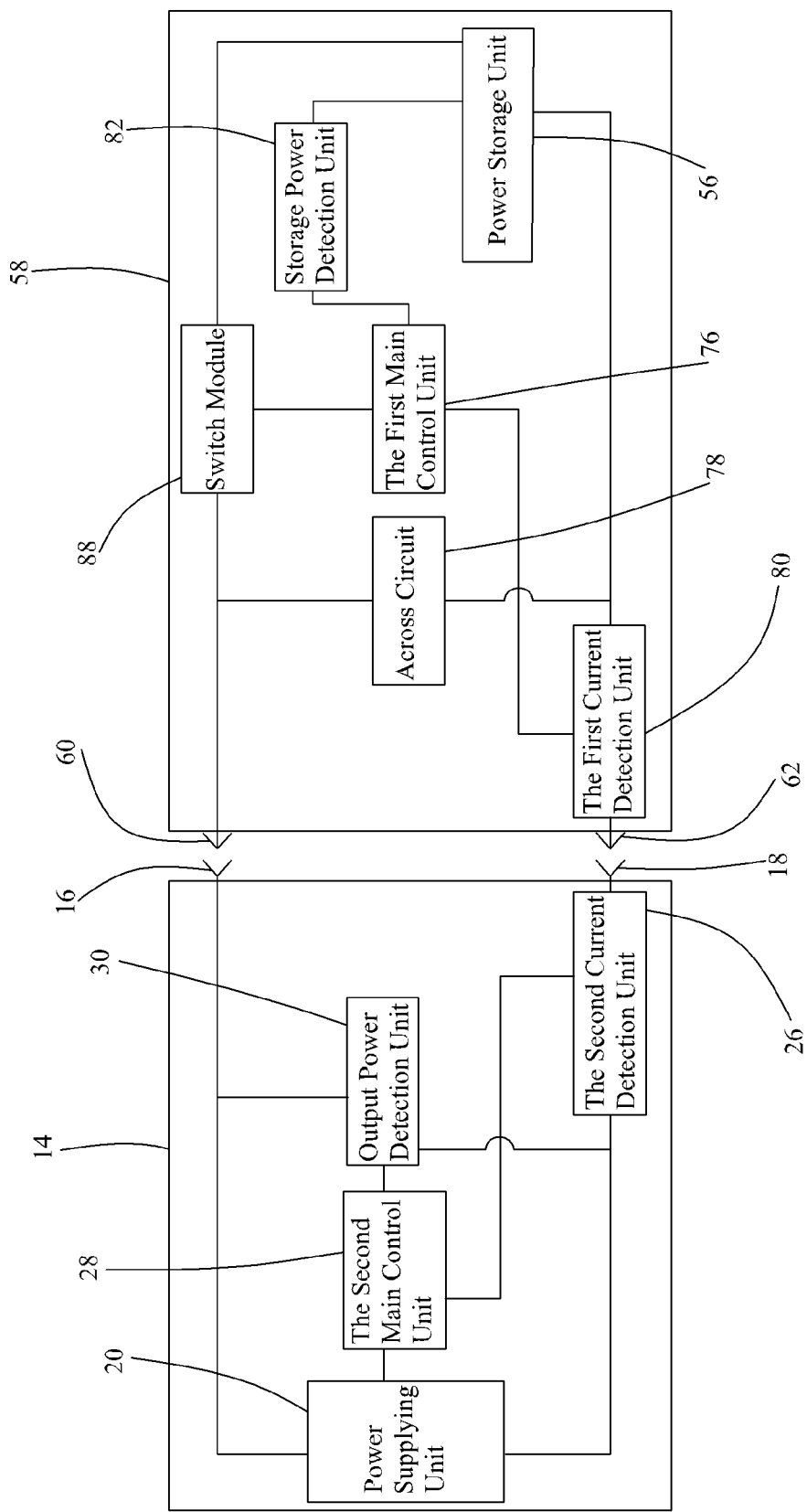
FIG. 3 is a circuit module view of the robot and the docking station in the first preferable embodiment of the present invention.
Figure 4:
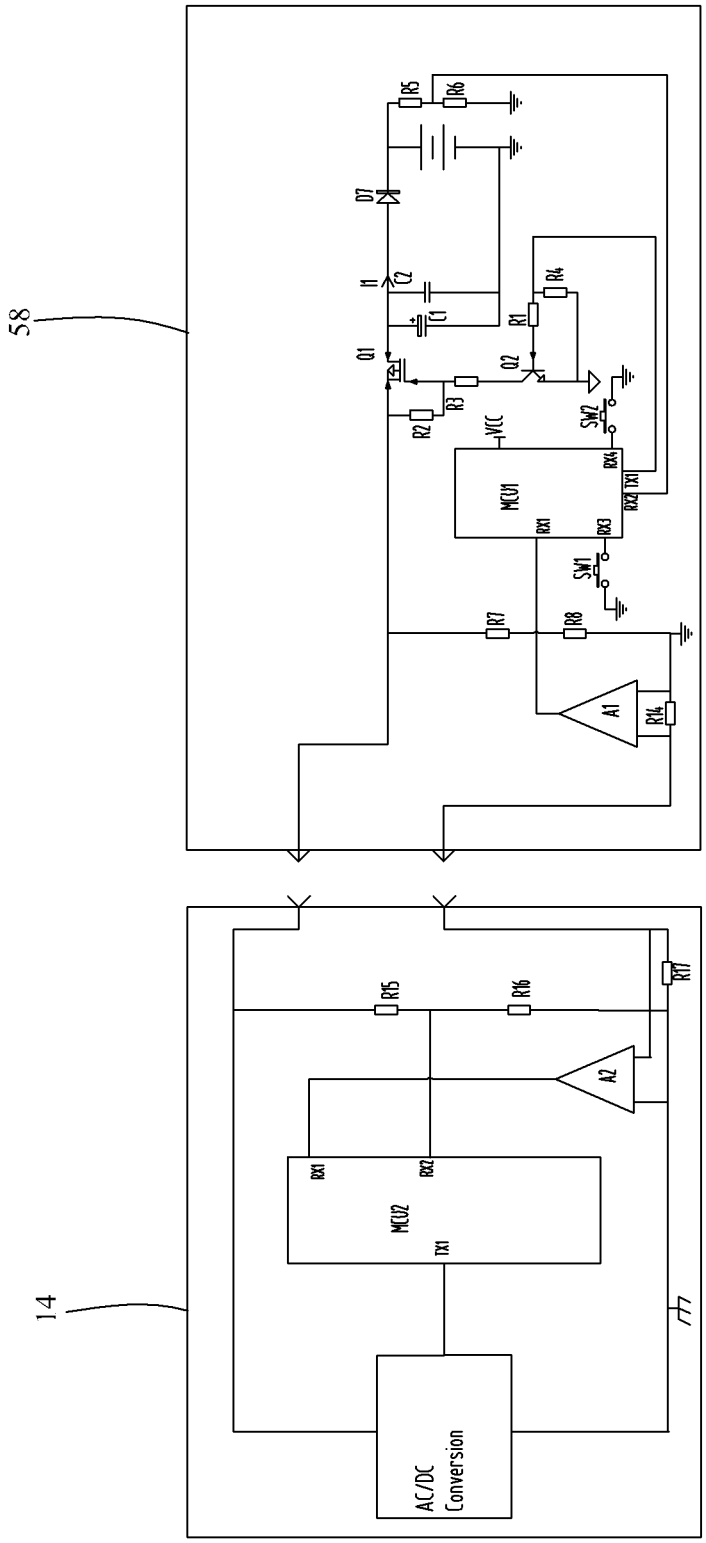
FIG. 4 is a circuit frame diagram of the robot and the docking station as shown in FIG. 3.

As shown in FIG. 3, the first circuit 58 comprises a first main control unit 76, a first current detection unit 80, a storage power detection unit 82, a across circuit 78, a switch module 88, and a power storage unit 56. The switch module 88 has on and off states. The switch module 88 is configured for controlling the power transmission from the first terminal 60 and the second terminal 62 to the power storage unit 56. The switch module 88 forbids the power transmission from the first terminal 60 and the second terminal 62 to the power storage unit 56 in the off state and allows the power transmission from the first terminal 60 and the second terminal 62 to the power storage unit 56 in the on state. The storage power detection unit 82 is configured for detecting the current power level of the power storage unit 56 and transmits the detected signal to the first main control unit 76. The first current detection unit 80 is configured for detecting the current applied by the first group of terminals to the power storage unit 56 and transmits the detected current signal to the first main control unit 76. The first main control unit 76 is electrically connected with the first current detection unit 80, the storage power detection unit 82 and the switch module 88, and controls the state of the switch module 88 according to the signals detected by the first current detection unit 80 and the storage power detection unit 82. The across circuit 78 is electrically connected with the first terminal 60 and the second terminal 62. The current received by either the first terminal 60 or the second terminal 62 directly flows to the other of the two through the across circuit 78.

The second circuit 14 comprises a power supplying unit 20, a second main control unit 28, a second current detection unit 26, and an output power detection unit 30. The power supplying unit 20 acquires power from an external AC power supply through the power wire 12, converts the acquired power into a DC power supply and applies the DC power supply to the second group of terminals. The DC power supply may be a charging power suitable for charging the power storage unit 56 of the robot 50, or a detection power for detecting whether the docking station 10 docked with the robot 50. The detection power is a tangible and safe non-charging power which is less than the charging power and cannot charge the power storage unit 56. The electric power consumed at the moment when the docking station outputs the charging power is more than that consumed at the moment when the docking station outputs the detection power. The second current detection unit 26 detects the current flowing across the second group of terminals and transmits the detected current signal to the second main control unit 28. The second main control unit 28 controls the power supplying unit 20 to output the charging power or detection power according to the current signal transmitted by the second current detection unit 26.

The robot 50 is provided with many ways for startup and return, such as the working time expiration, work completion, insufficient power, exposure to rain and forced return, all of which can serve as conditions of the robot 50 for returning to the docking station 10. When detecting any one of the above mentioned conditions, the first main control 76 controls the robot 50 to return to the docking station 10. Detection of the working time and work completion is realized by a working timer located in the first main control unit 76. When the predetermined time is up, the robot 50 is controlled to return to the docking station 10. The detailed implementations are well known for those skilled in the art and therefore omitted in this text. The detection of insufficient power is carried out by the storage power detection unit 82 which detects the current power level of the power storage unit 56 at any time and feeds back the detected signal to the first main control unit 76. When the power of the power storage unit 56 is reduced to a predetermined threshold value, the first control unit 76 controls the robot 50 to return to the docking station 10 so as to charge the power storage unit 56. The predetermined threshold value is comprehensively determined according to the chemical features of the power storage unit 56, the working state of the robot 50, etc., thereby ensuring that the power storage unit 56 can be fully used after being charged every time and preventing the situation where the robot 50 cannot return to the docking station 10 halfway because of the power exhaustion of the power storage unit 56. The detection of exposure to rain is realized by a rain detection unit 92 located at the housing surface of the robot 50. The rain detection unit 92 is electrically connected with the first control unit 76. In the case of exposure to the rain, the rain detection unit 92 generates and transmits a corresponding signal to the first control unit 76, and then the first control unit 76 controls the robot 50 to return to be charged. Thus, the robot 50 can be effectively prevented from damage because of being caught in the rain in this way. The forced return is realized by a forced return assembly 90 located at the housing surface of the robot 50. The forced return assembly 90 is electrically connected with the first control unit 76. When detecting the user's needs on forced return, the forced return assembly 90 can transmit the user's needs into the first control unit 76 in the electrical signal form. The first control unit 76 controls the robot 50 to return to the docking station 10. Quickly responding to the user's charging needs is mainly realized in this way. Even if the power storage unit 56 has a great amount of power, the user can transmit a return instruction to the first control unit 76 through the forced return assembly 90. After receiving the return instruction, the first control unit 76 controls the robot 50 to return to the docking station 10 for charging the power storage unit 56.

The first main control unit 76 controls the switch module 88 to maintain the off state while the robot 50 is returning to the docking station 10, thereby forbidding power transmission between the first group of terminals and the power storage unit 56. Meanwhile, the second main control unit 28 controls the power supplying unit 20 to output the detecting power to the second group of terminals, thus saving electric power consumed by the docking station 10 and improving safety for touching the second group of terminals for human body.

When the robot 50 reached the docking station 10 and docked with the docking station 10, the first group of terminals is in correspondingly electrical connection with the second group of terminals, and the second circuit 14 and the first circuit 58 form a detection circuit through the second group of terminals and the first group of terminals. Specifically, the power supplying unit 20 and the second current detection unit 26 of the second circuit 14 together with the across circuit 78 and the first current detection unit 80 of the first circuit 58 form a detection circuit through the second group of terminals and the first group of terminals. The detection power supplied from the power supplying unit 20 to the first group of terminals flows across the detection circuit to generate a detection current. The detection circuit is detected by the first current detection unit 80 and the second current detection unit 26 when flowing across the above detection circuit, wherein the first current detection unit 80 transmits the detected detection current to the first main control unit 76. The first main control unit 76 confirms that the robot 50 docked with the docking station 10 when confirming reception of the detection current, and controls the robot 50 to stop travelling and the switch module 88 to be in the on state to allow the power transmission from the first group of terminals to the power storage unit 56. The second current detection unit 26 transmits the detected detection current to the second main control unit 28. The second main control unit 28 confirms that the first group of terminals of the robot 50 docked with the second group of terminals of the docking station 10 when confirming the reception of the detection current, and then controls the power supplying unit 20 to be switched from outputting the detection power into the charging power. The charging power flows across the second group of terminals, the first group of terminals and the switch module 88 to charge the power storage unit of the robot 50. On the contrary, when the first group of terminals of the robot 50 failed to dock with the second group of terminals of the docking station 10, the first group of terminals and the second group of terminals are not in corresponding electrical connection, and the detection circuit cannot be formed, so the detection current cannot be generated. Both the first current detection unit 80 and the second current detection unit 26 fail to detect the detection current. In this state, both first main control unit 76 and the second main control unit 28 do not confirm that the robot 50 docked with the docking station 10. The first main control unit 76 controls the robot 50 moving continuously to find the docking station 10. The second main control unit 28 controls the power supplying unit 20 to continuously supply the detection power to the second group of terminals.

From the above description it can be known that, in the first embodiment, the second main control unit 28 controls the power supplying unit 20 to output safe and lower detection power before the robot 50 docked with the docking station 10 and controls the power supplying unit 20 to output the higher charging power suitable for charging the power storage unit 56 after the robot 50 docked with the docking station 10. Controlling the power supplying unit 20 to output lower power before docking and outputting bigger power after docking effectively reduces the power consumed by the docking station 10 and lowers the risks of touching the docking station 10 for human body.

After charging is started, the second current detection unit 26 of the docking station 10 detects the charging current applied by the power supplying unit 20 to the first group of terminals at any time. Once the charging current is detected to be less than a preset current value, the second main control unit 28 controls the power supplying unit 20 to be switched from the state of supplying the charging power to the second group of terminals to the state of supplying the detection power to the second group of terminals, thus stopping charging of the robot 50. Meanwhile, the first current detection unit 80 of the robot 50 detects the charging current applied by the first group of terminals to the power storage unit 56 at any time, and transmits the detected signal to the first main control unit 76. Once the charging current is detected to be less than a preset current value, the first main control unit 76 controls the switch module 88 to be switched off, thus terminating the power transmission from the first group of terminals to the power storage unit 56. Expect for the method of detecting the charging current by the first current detection unit 80 to judge whether to forbid the power transmission, the first main control unit 76 also can judge whether to continue charging through detecting the current power level of the power storage unit 56 by the storage power detection unit 82. Moreover, the first main control unit 76 also can judge whether the charging time exceeds a preset value in a way of being internally provided with a timer to control the power transmission. The first main control unit 76 also can judge whether to forbid the power transmission through detecting the internal information of the power storage unit 56, such as: detecting the internal temperature of the power storage unit 56. The first main control unit 76 forbids the power transmission from the first group of terminals to the power storage unit 56 when the internal temperature of the power storage unit 56 exceeds a preset temperature scope, thereby terminating charging of the power storage unit 56. The first main control unit 76 judges the need of forbidding the power transmission through any one of the above mentioned ways and controls the switch module 88 to be off. The charging process ends, and the robot 50 returns to the working area 102 again to work continuously.

In the process of confirming that the first group of terminals of the robot 50 docked with the second group of terminals of the docking station 10, charging is started through confirming once that the robot 50 docked with the docking station 10. In an actual situation, the first group of terminals and the second group of terminals may be separated after the robot 50 stops moving because of the difference in time when the detection current is detected and when the robot 50 stops moving. At this moment, the first current detection unit 80 and the second current detection unit 26 fail to detect the detection current while the charging has been started. In such circumstance, the first current detection unit 80 and the second current detection unit 26 detect zero current, resulting in the first main control unit 76 and the second main control unit 28 making a wrong conclusion that the charging current is less than the preset current, therefore they stop charging and control the robot 50 to return to the working area 102 again to work. To prevent the abovementioned situation, the first main control unit 76 and the second main control unit 28 are configured to confirm twice that the first group of terminals of the robot 50 docked with the second group of terminals of the docking station 10. The first main control unit 76 controls the robot 50 to stop moving after confirming for the first time that the first group of terminals of the robot 50 docked with the second group of terminals of the docking station 10, and then confirms if the first current detection unit 80 detects the detection current again in a preset time period. If the detection current is detected again at any time in the preset time period, the first main control unit 76 re-confirms that the first group of terminals of the robot 50 docked with the second group of terminals of the docking station 10, and controls the robot 50 to keep still and the switch module 88 to be switched from the off state into the on state, waiting for charging. At the same time, the second main control unit 28 controls the power supplying unit 20 continuously supplying the detection power to the second group of terminals after confirming for the first time that the first group of terminals of the robot 50 docked with the second group of terminals of the docking station 10, and then confirms if the second current detection unit 26 detects the detection current again in a preset time period. If the detection current is re-detected at any time in the preset time period, the second main control unit 28 re-confirms that the first group of terminals of the robot 50 docked with the second group of terminals of the docking station 10 and controls the power supplying unit 20 to supply the charging power to the terminal group, starting charging. On the contrary, if the detection current is not detected again in the preset time period, the first main control unit 76 controls the robot 50 to start moving and try to dock again. The second main control unit 28 controls the power supplying unit continuously supplying the detection power to the second group of terminals, and repeats the abovementioned process of confirming that the first group of terminals of the robot 50 docked with the second group of terminals of the docking station 10. Those skilled in the art can understand that the first main control unit 76 and the second main control unit 28 may be configured to continuously detect the detection current in the preset time period to confirm that the robot 50 docked with the docking station 10. The whole detection response process is very short, so the preset time is generally set to be short, 2S in the first embodiment.

The composition and working mode of each of the functional units of the simplified terminal structure-based first circuit 58 and second circuit 14 are described in detail below with reference to FIG. 4.

The first main control unit 76 is mainly configured for receiving and judging signals, generating control signals according to the signal judgment result, etc. Based on the abovementioned functional needs, the first main control unit 76 may be set as an analogue circuit, a digital circuit, or combination of the analogue circuit and a digital circuit. In the first embodiment, the first main control unit 76 is a microcontroller MCU1, namely the integrated circuit unit known for those skilled in the art to execute related actions and realize corresponding functions through compiling preset programs. The corresponding functions at least include detection, identification, judgment, generation and transmission of signals, timing, and calculation. The microcontroller MCU1 further comprises first signal receiving ports RX1, RX2, RX3, RX4 and a first signal transmitting port TX1. The first signal receiving portion RX1 is electrically connected with the first current detection unit 80 for receiving the current signal transmitted from the first current detection unit 80. The first signal receiving port RX2 is electrically connected with the storage power detection unit 82 for receiving the signal from the storage power detection unit 82 that identifies the current power of the power storage unit 56. The first signal receiving ports RX3 and RX4 are respectively electrically connected with the forced return assembly 90 and the rain detection unit 92 for judging whether to control the robot 50 to return to the docking station. The first signal transmitting port TX1 is electrically connected with the switch module 88 for transmitting the control signal to the switch module 88 so as to control the power transmission from the first terminal 60 and the second terminal 62 to the power storage unit 56. The first main control unit 76 controls the signal output of the first signal transmitting port TX1 according to the signals received by the first signal receiving ports RX1, RX2, RX3 and RX4.

The across circuit 78 is configured for electrically connecting the first terminal 60 and the second terminal 62. Based on this function, the across circuit 78 be set as any circuit which can realize connection between the first terminal 60 and the second terminal 62, such as the circuit including resistors only and the circuit including resistors and a switch. In the first embodiment, the across circuit 78 is set as a simply structured circuit including resistors only. As shown in FIG. 4, the across circuit 78 includes resistors R7 and R8. The resistance of the resistor R7 and R8 are preferably 10K respectively, which not only transmit the detection current between the first terminal 60 and the second terminal 62, but also avoid great consumption of the charging current.

The storage power detection unit 82 is mainly configured for detecting the power of the power storage unit 56 at any time during working and charging of the robot 50 and transmitting the detected signal to the first signal receiving port RX2. When the robot 50 works, the microcontroller MCU1 judges whether the power of the power storage unit 56 is less than a predetermined power level according to the received signal so as to judge whether the robot 50 is required to return to the docking station 10 to be charged. When the robot 50 is charged, the microcontroller MCU1 judges whether the power of the power storage unit 56 is more than a predetermined power level according to the received signal so as to judge whether to terminate charging through the switch module 88. When the robot 50 works, the microcontroller MCU1 controls the robot 50 to return to the docking station 10 along the boundary wire 100 once judging that the power of the power storage unit 56 is less than a predetermined power level. When the robot 50 is charged, the microcontroller MCU1 controls the robot 50 to stop charging once detecting that the power of the power storage unit 56 is less than a predetermined power level. The current power level of the power storage unit 56 can be detected by means of detecting the voltage level, discharging current, charging current, discharging time or charging time of the power storage unit 56 to calculate the power level of the power storage unit 56, etc. The method of detecting the voltage level of the power storage unit 56 is adopted in the first embodiment. This way is advantaged in simple realization. As shown in FIG. 4, the storage power detection unit 82 includes the resistors R5 and R6 which are connected in series to form a voltage divider. The voltage of the power storage unit 56 is detected through the voltage divider constituted by the resistors R5 and R6. When the robot 50 works, the microcontroller MCU1 judges whether the voltage of the power storage unit 56 is less than a predetermined voltage value according to the voltage signal transmitted from the power storage detection unit 82 and therefore judges whether the robot 50 is required to return to the docking station 10 to be charged. When the robot 50 is charged, the microcontroller MCU1 judges whether the power of the power storage unit 56 is more than a predetermined voltage level according to voltage signal transmitted by the storage power detection unit 56 and therefore judges whether to terminate charging through the switch module 88. In this embodiment, the power storage unit 56 is a lead-acid battery with a nominal voltage of 24V, so the predetermined voltage value in the working process is set to 21.6V. However, the lead-acid battery generally determines whether to terminate charging by judging the charging current, so the signal of the storage power detection unit 82 in the first embodiment is not used as the condition for judging whether to terminate charging. So the predetermined voltage is not limited in the charging process.

The forced return assembly 90 is configured for quickly responding to user's charging needs and feeding back the needs in the form of an electric signal to the microcontroller MCU1. This function can be realized by many ways, such as sensing the user's voice, touch, etc. Compared with the method of sensing the user's voice, the method of sensing the user's touch is simpler, so the latter is adopted in the first embodiment. Based on the method of sensing the user's touch, the forced return assembly 90 can be set as the normally open switch or trigger switch, specifically as the trigger switch. As shown in FIG. 4, the switch SW1 has one end electrically connected with the negative electrode of the power storage unit 56 and one end electrically connected with the first signal receiving port RX3 of the microcontroller MCU1. Usually, the first signal receiving port RX3 is in the high resistance state. Once the user presses to close the switch SW1, the first signal receiving port RX3 can receive a low level. The microcontroller MCU1 responds to the low level received by the first signal receiving port RX3 and controls the robot 50 to return to the docking station 10 for charging the power storage unit 56.

The rain detection unit 92 is configured for detecting if the rain water leaks into the robot 50, and if so, transmitting the detected signal to the microcontroller MCU1 through the first signal receiving port RX4. The microcontroller MCU1 controls the robot 50 to return to the docking station 10 to take shelter from the rain, thereby preventing the rain water from corroding the robot 50. The rain detection unit 92 can be realized through two mutually isolated metal sheets, one electrically connected with the first signal receiving port RX4 of the microcontroller MCU1, and the other electrically with the negative electrode of the power storage unit 56. In the case of no rain water, the two metal sheets remain mutually isolated, and the first signal receiving port RX4 is suspended. In the case of exposure to the rain, the two metal sheets are connected mutually through the rain water; the first signal receiving port RX4 receives a low level signal and the microcontroller MCU1 controls the robot 50 to return to the docking station 10 to take shelter from the rain. The two metal sheets function as a switch, so the rain detection unit 92 in FIG. 4 is represented by the switch SW2.

The first current detection unit 80 is mainly configured for detecting the current applied by the first terminal and the second terminal to the power storage unit 56 when the robot 50 returns to the docking station 10 and when the robot 50 is charged, and transmitting the detected current signal to the microcontroller MCU1. In the returning process, the first main control unit 76 confirms whether the first current detection unit 80 detects a predetermined non-charging voltage according to the signal that identifies whether the first current detection unit 80 detects the detection current, and then confirms whether the first group of terminals of the robot 50 docked with the second group of terminals of the docking station 10. In the charging process, the first main control unit 76 judges whether to terminate charging by judging whether the charging current detected by the first current detection unit 80 is less than a predetermined current value. The first current detection unit 80 can be set in many forms according to the functions thereof. In the first embodiment, the first current detection unit 80 is realized by adopting a micro-resistor and a computing amplifier which are well-known for those skilled in the art. As shown in FIG. 4, the first current detection unit 80 includes a micro-resistor R14 located between the second terminal 62 and the power storage unit 56, and a computing amplifier A1 which amplifies the voltage applied to the micro-resistor R14 and transmits the amplified signal to the first signal receiving port RX1. After detecting the voltage applied to the micro-resistor R14 through the first signal receiving port RX1, the microcontroller MCU1 performs corresponding computation to judge the current flowing across the micro-resistor R14, thus obtaining the current flowing across the first terminal 60 and the second terminal 62. When the third terminal 16 and the fourth terminal 18 are respectively in corresponding electrical connection with the first terminal 60 and the second terminal 62, the second circuit 14 and the first circuit 58 form the detection circuit. Specifically, the power supplying unit 20 and the second current detection unit 26 together with the across circuit 78 and the first current detection unit 82 form the detection circuit through the third terminal 16, the fourth terminal 18, the first terminal 60 and the second terminal 62. The detection power supplied by the power supplying unit 20 flows across the detection circuit to generate the detection current. At this moment, the first current detection unit 80 detects the detection current and transmits the detected detection current to the microcontroller MCU1. The MCU1 confirms that the first group of terminals of the robot 50 docked with the second group of terminals of the docking station 10 when confirming reception of the detection current. On the contrary, forming the detection circuit and generating the detection current cannot be realized when the third terminal 16 and the fourth terminal 18 are separated from one or two of the first terminal 60 and the second terminal 62, so the first current detection unit 80 fails to detect the detection current. Accordingly, the microcontroller MCU1 does not confirm that the first group of terminals of the robot 50 docked with the second group of terminals of the docking station 10. As mentioned above, the first current detection unit 80 is used not only for detecting and feeding back the detection current to the microcontroller MCU1 to judge whether the first group of terminals of the robot 50 docked with the second group of terminals of the docking station 10 in the docking process, but also for detecting and feeding back the charging current to the microcontroller MCU1 to judge whether to terminate charging in the charging process. In the docking process, the microcontroller MCU1 is set to detect the detection current and confirm that the first group of terminals of the robot 50 docked with the second group of terminals of the docking station 10. In the charging process, the microcontroller MCU1 is set to transmit a signal to the switch module 88 to terminate charging when the detected charging current is less than a certain predetermined current value. The predetermined current value is set according to the features of the power storage unit 56. In the first embodiment, the power storage unit 56 is a lead-acid battery, and the predetermined value is set to 200 mA according to the features of the lead-acid battery.

The switch module 88 having the on state and off state is configured for controlling the power transmission from the first terminal 60 and the second terminal 62 to the power storage unit 56. The switch module 88 allows the power transmission from the first terminal 60 and the second terminal 62 to the power storage unit 56 in the on state and forbidds the power transmission from the first terminal 60 and the second terminal 62 to the power storage unit 56 in the off state. The microcontroller MCU1 transmits the control signal to control the switch module 88 to be in the on state when confirming that the first group of terminals of the robot 50 docked with the second group of terminals of the docking station 10. When the docking station 10 charges the robot 50, the microcontroller MCU1 transmits the control signal through the first signal transmitting port TX1 to control the switch module 88 to be in the on or off state according to the current signal transmitted by the first current detection unit 80. Aiming at the functions of the switch module 88, the switch module 88 at least can be set as the combination of a driving circuit and an MOS tube or the combination of a driving circuit and a relay. As shown in FIG. 4, the combination of the driving circuit and the MOS tube is adopted in the first embodiment, wherein the MOS tube Q1 is located between the first terminal 60 and the positive electrode of the power storage unit 56; the driving circuit is located between the first signal transmitting port TX1 and the MOS tube Q1; and the driving circuit further includes a resistor R2 and a resistor R3 for driving the MOS tube Q1, a switch transistor Q2, and a resistor R4 and a resistor R1 for driving the switch transistor Q2. Usually, the microcontroller MCU1 transmits a low level signal through the first signal transmitting port TX1 to switch off the switch transistor Q2 and then switch off the MOS tube Q1. The switch module 88 is in the off state, thus preventing the control circuit from consuming the power of the power storage unit 56. Once confirming that the first group of terminals of the robot 50 docked with the second group of terminals of the docking station 10, the microcontroller MCU1 transmits a high level signal through the first signal transmitting port TX1 to switch on the switch transistor Q2 and then switch on the MOS tube Q1. The switch module 88 is in the on state and therefore allows the power transmission from the first terminal 60 and the second terminal 62 to the power storage unit 56, namely allows the docking station 10 to charge the robot 50. After charging is started, the first current detection unit 80 detects the current from the first terminal 60 and the second terminal 62 to the power storage unit 56 at any time and transmits the detected signal to the microcontroller MCU1 through the first signal receiving port RX1. Once detecting that the current is less than 200 mA, the microcontroller MCU1 transmits the low level signal through the first signal transmitting port TX1 to switch off the switch transistor Q2 and then switch off the MOS tube Q1, thereby terminating the power transmission from the first terminal 60 and the second terminal 62 to the power storage unit 56, namely stopping the docking station 10 from charging the robot 50.

The above are detailed descriptions of the specific structures, working modes and mutual influences of functional units included in the first circuit 58. The following are detailed descriptions of the specific structures and working modes of the functional units included in the second circuit 14.

The second main control unit 28 is mainly configured for receiving and judging signals, generating control signals according to the signal judgment result, etc. Based on the mentioned function needs, the second main control unit 28 can be set as an analogue circuit, digital circuit, or combination of an analogue circuit and a digital circuit. In the first embodiment, the second main control unit 28 is a microcontroller MCU2, namely the integrated circuit well-known for those skilled in the art to execute the related actions and realize corresponding functions through compiling predetermined programs. The corresponding functions at least include detection, identification, judgment, generation and transmission of signals, timing and calculation. The microcontroller MCU2 further comprises second signal receiving ports RX1, RX2 and a second signal transmitting port TX1. The second signal receiving port RX1 is electrically connected with the second current detection unit 26 for receiving the current signal transmitted by the second current detection unit 26. The second signal receiving port RX2 is electrically connected with the output power detection unit 30 for receiving the power signal transmitted by the output power detection unit 30. The second signal transmitting port TX1 is electrically connected with the power supplying unit 20 for transmitting the control signal to control the power supplied from the power supplying unit 20 to the third terminal 16 and the fourth terminal 18.

The power supplying unit 20 acquires power from the external AC power supply through the power wire 12, converts the power correspondingly and then transmits the converted power to the terminal 16 and the fourth terminal 18. Usually, the power supplying unit 20 may be set as the combination of a switching power supply and a control circuit or the combination of a transformer and a control circuit. The power conversion efficiency of the switching power supply is higher than that of the transformer, so the combination of the switching power supply and the control circuit is adopted in this embodiment. The switching power supply converts a high voltage AC power supply into a DC power supply. The DC power supply has two forms. The first form is the detection power which is a non-charging power and cannot be used to charge the robot 50. The detection power is less than the voltage which the power storage unit 56 is present when the robot 50 returns to the docking station 10, and the detection power is even less than 5V. In the first embodiment, the predetermined voltage value is set to 10V, thus ensuring safety and effectively reducing power consumption of the docking station 10 in the state of not charging the robot 50.

The second form is the charging power. The power supplying unit 20 supplies the charging power suitable for charging the power storage unit 56 of the robot 50 after the robot 50 docked with the docking station 10. Both the specific form and value of the power output by the power supplying unit 20 are under control of the second main control unit 28.

The second current detection unit 26 is mainly configured for detecting the current flowing across the third terminal 16 and the fourth terminal 18 in the docking station 10 and transmitting the detected current signal to the second main control unit 28. The second main control unit 28 judges if the first group of terminals of the robot 50 docked with the second group of terminals of the docking station 10 through judging whether the detection current has been detected by the second current detection unit 26 before the robot 50 docked with the docking station 10, and judges whether to terminate charging through judging whether the charging current detected by the second current detection unit 26 is less than a predetermined current value. Aiming at the functions of the second current detection unit 26, the second current detection unit 26 can be set in many forms according to the function thereof. In the first embodiment, the second current detection unit 26 is realized by adopting micro-resistors and the computing amplifier which are well-known for those skilled in the art. As shown in FIG. 4, the second current detection unit 26 includes a micro-resistor R17 located between the fourth terminal 18 and the negative electrode of the power storage unit 20, and a computing amplifier A2 which amplifies the voltage applied to the micro-resistor R17 and transmits the amplified signal to the second signal receiving port RX1. After detecting the voltage applied to the micro-resistor R17 through the second signal receiving port RX1, the microcontroller MCU2 performs corresponding computation to judge the current flowing across the micro-resistor R17, thus obtaining the value of the current applied by the power supplying unit 20 to the third terminal 16 and the fourth terminal 18.

The output power detection unit 30 is configured for detecting the power supplied by the power supplying unit 20 to the third terminal 16 and the fourth terminal 18 and transmitting the detected power signal to the second main control unit 28 so that the second main control unit 28 controls the power supplied by the power supplying unit 20. In the first embodiment, the output power detection unit 30 is set to detect the voltage supplied by the power supplying unit 20 to the third terminal 16 and the fourth terminal 18. As shown in FIG. 4, the output power detection unit 30 includes resistors R15 and R16 bridged to the two ends of the power supplying unit 20. The voltage supplied by the power supplying unit 20 to the third terminal 16 and the fourth terminal 18 is detected through voltage division by the two resistors.

When the third terminal 16 and the fourth terminal 18 are respectively electrical connected with the first terminal 60 and the second terminal 62, the power supplying unit 20 and the second current detection unit 26 together with the across circuit 78 and the first current detection unit 80 form the detection circuit through the third terminal 16, the fourth terminal 18, the first terminal 60 and a second terminal 62. The detection power supplied by the power supplying unit 20 flows across the detection circuit to generate the detection current. At this moment, the second current detection unit 26 detects the detection current and transmits the detected current signal to the second main control unit 28. The second main control unit 28 confirms that the first group of terminals of the robot 50 docked with the second group of terminals of the docking station 10 when confirming that the second current detection unit 26 detects the detection current. On the contrary, forming the detection circuit and generating the detection current cannot be realized when the third terminal 16 and the fourth terminal 18 are separated from one or two of the first terminal 60 and the second terminal 62, so the second current detection unit 26 fails to detect the detection current. Accordingly, the second main control unit 28 does not confirm that the first group of terminals of the robot 50 docked with the second group of terminals of the docking station 10. As mentioned above, the second current detection unit 26 is used not only for detecting and feeding back the detection current to the second main control unit 28 to judge whether the first group of terminals of the robot 50 docked with the second group of terminals of the docking station 10 in the docking process, but also for detecting and feeding back the charging current to the second main control unit 28 to judge whether to terminate charging in the charging process. In the docking process, the second main control unit 28 is set to detect the detection current and then judges that the first terminal 60 and the second terminal 62 are respectively in electrical connection with the third terminal 16 and the fourth terminal 18. In the charging process, the second main control unit 28 is set to transmit a signal to the switch module 20 to terminate charging when the detected charging current is less than a certain predetermined current value. The predetermined current value is set according to the features of the power storage unit 56. In the first embodiment, the power storage unit 56 is a lead-acid battery, and the predetermined value is set to 200 mA according to the features of the lead-acid battery.

The above are detailed description of the functions, specific structure and mutual influences of each of the functional units of the second circuit 14 and the first circuit 58 with reference to the circuit frame diagram. The following are the detailed descriptions of docking and charging between the robot 50 and the docking station 10 with reference to the workflow charts of the microcontroller MCU1 and the microcontroller MCU2 as shown in FIG. 5 and FIG. 6.

Figure 5:
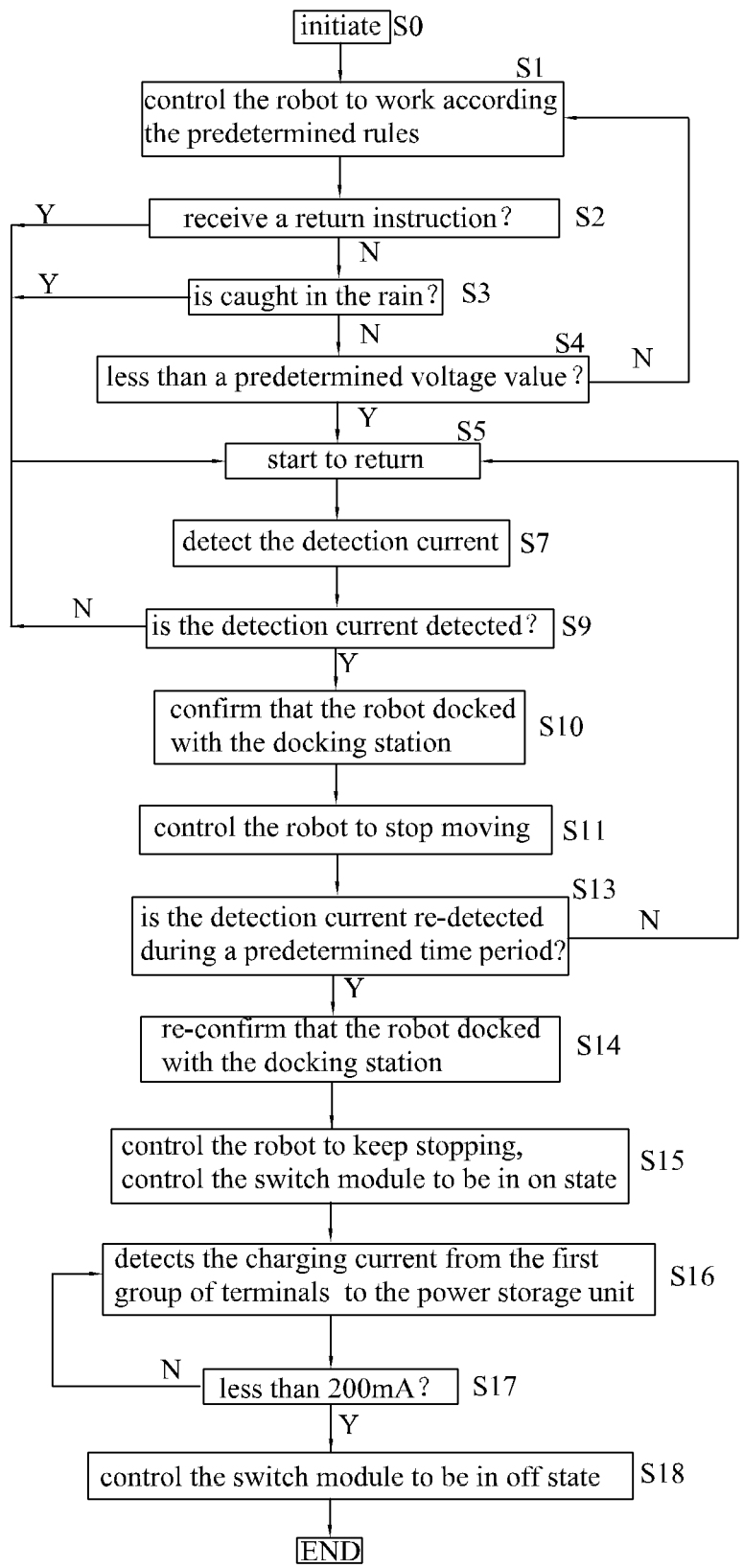
FIG. 5 is a workflow chart of the robot as shown in FIG. 4.

FIG. 5 shows the workflow of the microcontroller MCU1. After the robot 50 starts to work, execute step S0: initiate. After the initiating is completed, execute step S1: control the robot 50 to work according the predetermined rules in the working area 102 defined by the boundary wire 100. Execute step S2: judge if the user outputs a return instruction through the forced return assembly 90. If the judgment result is yes, turn to step S5, and if not, execute step S3: judge if the robot 50 is caught in the rain through the signal transmitted by the rain detection unit 92. If the judgment result is yes, turn to step S5. If the judgment result is no, execute step S4: judge if the voltage of the power storage unit 56 detected by the storage power detection unit 82 is less than a predetermined voltage value. If the judgment result is no, return to step S1. If the judgment result is yes, execute step S5: control the robot 50 to return to the docking station 10 along the boundary wire 100. After executing step 5, turn to step S7: detect the detection current flowing across the first terminal 60 and the second terminal 62. Then, execute step S9: further judge if the detection current is detected. When the first group of terminals and the second group of terminals are in corresponding electrical connection, the power supplying unit 20 and the second current detection unit 26 of the second circuit 14 together with the across circuit 78 and the first current detection unit 80 of the second circuit 58 form the detection circuit through the first group of terminals and the second group of terminals. The detection power supplied by the power supplying unit 20 flows across the detection circuit to generate the detection current. The first current detection unit 80 detects the detection current, so the judgment result is yes in this case. On the contrary, when the first group of terminals and the second group of terminals are not correspondingly in electrical connection, the first circuit 58 and the second circuit 14 cannot form the detection circuit, and the first current detection unit 80 fails to detect the detection current, so the judgment result is no in this case, and then return to step S5. In the case that the judgment result is yes, execute step S10: confirm that the first group of terminals of the robot 50 docked with the second group of terminals of the docking station 10. Then, execute step S11: control the robot 50 to stop moving. Execute step S13: continuously detect the detection current that flows across the first terminal 60 and the second terminal 62 and judge if the detection current is re-detected in a predetermined time period. If the judgment result is no, this means that docking failed, and then return to step S5 to control the robot 50 to start moving and try to dock again. If the judgment result is yes, execute step S14: re-confirm that the first group of terminals of the robot 50 docked with the second group of terminals of the docking station 10. Then execute step S15: control the robot 50 to keep stopping, control the switch module 88 to be switched from the off state into the on state, and then wait for the docking station 10 to be started to charge. The workflow of the microcontroller MCU1 may not include the steps S13 and S14. Here, the objective of adding those two steps is to strengthen the anti-interference when the microcontroller MCU1 is started and waits for charging, thus enhancing safety for touching the second group of terminals for the human body.

Figure 6:
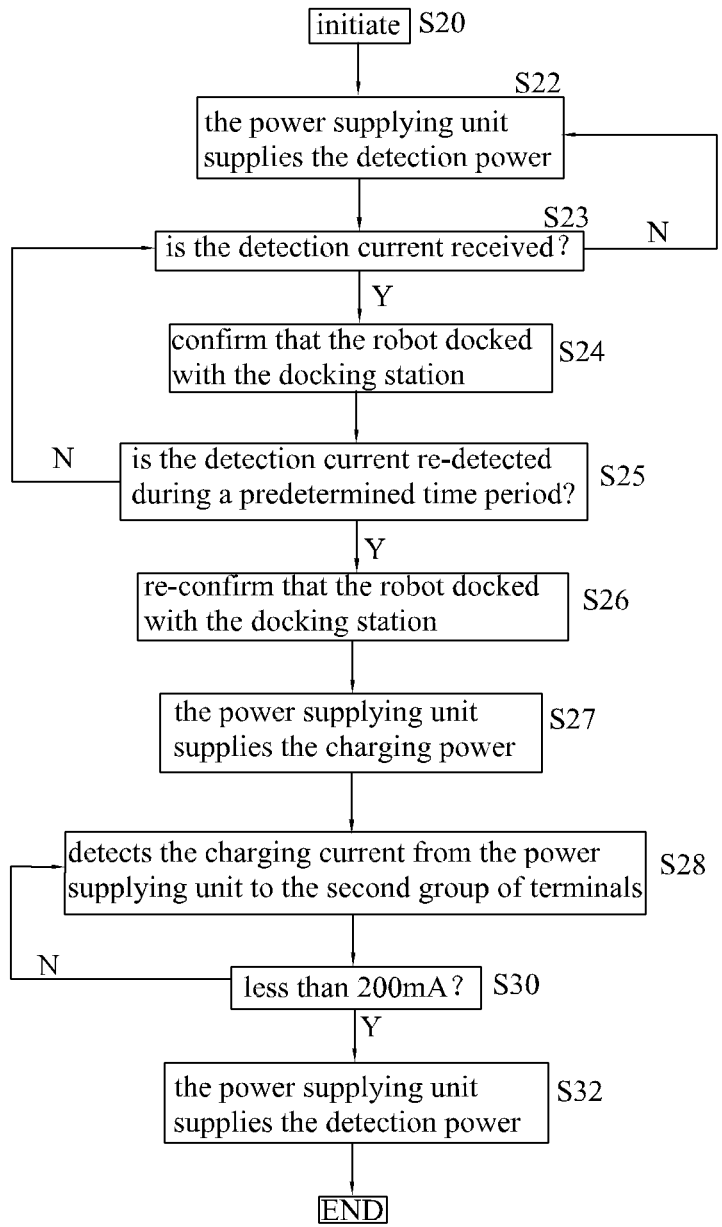
FIG. 6 is a workflow chart of the docking station as shown in FIG. 4.

FIG. 6 shows the workflow of the microcontroller MCU2. After the docking station 10 is connected with the external power supply, execute step S20: initiate. Execute step 22: control the power supplying unit 20 to supply the detection power to the second group of terminals. Execute step 23: judge if the detection current is received. When the second group of terminals and the first group of terminals are in corresponding electrical connection, the power supplying unit 20 and the second current detection unit 26 of the second circuit 14 together with the across circuit 78 and the first current detection unit 80 of the first par circuit 58 form the detection circuit through the first group of terminals and the second group of terminals; the detection power flows across the detection circuit to generate the detection current; the second current detection unit 26 detects the detection current and transmits the detection current to the second main control unit 28. In the case that the second main control unit 28 receives the detection current, execute step S24: the second main control unit 28 confirms that the first group of terminals of the robot 50 docked with the second group of terminals of the docking station 10. On the contrary, when the second group of terminals and the first group of terminals are not correspondingly in electrical connection, the detection current cannot be formed, and the second current detection unit 26 fails to detect the detection current. In this case, the judgment result is no, return to step S22. After the docking is confirmed in step S24, execute step S25: continuously detect if the detection current is detected again in the predetermined time period without other action. If the judgment result is yes, execute step S26: confirm that the first group of terminals of the robot 50 docked with the second group of terminals of the docking station 10 again. Then, execute step S27: control the docking station 10 to be started to charge and the power supplying unit 20 to supply the charging power to the second group of terminals. In step S25, if the judgment result is no, turn to step S23 to continuously detect if the detection current is received. The workflow of the microcontroller MCU2 may not include the step S25 and the step S26. Here, the objective of adding those two steps is to strengthen the anti-interference when the microcontroller MCU2 is started to charge. The second main control unit 28 controls the power supplying unit 20 to be switched from the state of supplying the detection power into the state of supplying the charging power only after the second current detection unit 26 detects the detection current once or twice, thus effectively reducing power consumption of the docking station 10 and lowering the risks of touching the docking station 10 for the human body.

After the docking station 10 is started to charge, the microcontroller MCU2 executes step S27: control the power supplying unit 20 to supply the charging power to the second group of terminals. Then, execute step S28: detect the charging current supplied by the power supplying unit 20 to the third terminal 16 and the fourth terminal 18 through the second current detection unit 26. Next, execute step S30: judge if the charging current is less than 200 mA. If the judgment result is no, return to step S28. If the judgment result is yes, execute step S32: control the power supplying unit 20 to supply the detection power to the second group of terminals, thus terminating charging the robot 50 by the docking station 10 and reducing the power consumption of the docking station 10 at the same time. Both microcontroller MCU2 and microcontroller MCU1 detect and control the charging process during charging. See FIG. 5. In step S16, the microcontroller MCU1 detects the charging current from the first group of terminals to the power storage unit 56 after confirming that the first group of terminals of the robot 50 docked with the second group of terminals of the docking station 10. In step S17, the microcontroller MCU1 further judges if the charging current is less than a predetermined current value 200 mA, if the judgment result is no, it returns to step S16, and if the judgment result is yes, turns to step S18. In step S18, the microcontroller MCU1 controls the switch module 88 to be switched from the on state into the off state to forbid the power transmission from the first group of terminals to the power storage unit 56. Then, charging the robot 50 by the docking station 10 is terminated.

The present invention also provides a second preferable embodiment. The second embodiment differs from the first preferable embodiment in that the detection power is supplied by the power storage unit 56 in the robot 50 instead of the power supplying unit 20', so the power supplied by the power supplying unit 20' may be less than that in the first embodiment before the docking station 10 is started to charge, even a zero non-charging power. Therefore, the power consumption of the docking station 10 can be further reduced on the basis of the first embodiment before the docking station 10 is started to charge. To achieve the optimal economical effect, the docking station 10 outputs zero power before being started to charge. In addition, the second embodiment also differs from the first embodiment in that, the across circuit 78' is located in the docking station 10 instead of the robot 50 and electrically connected with the third terminal 16 and the fourth terminal 18. The second preferable embodiment is described below in further detail with reference to FIGS. 7-10.

Figure 7:
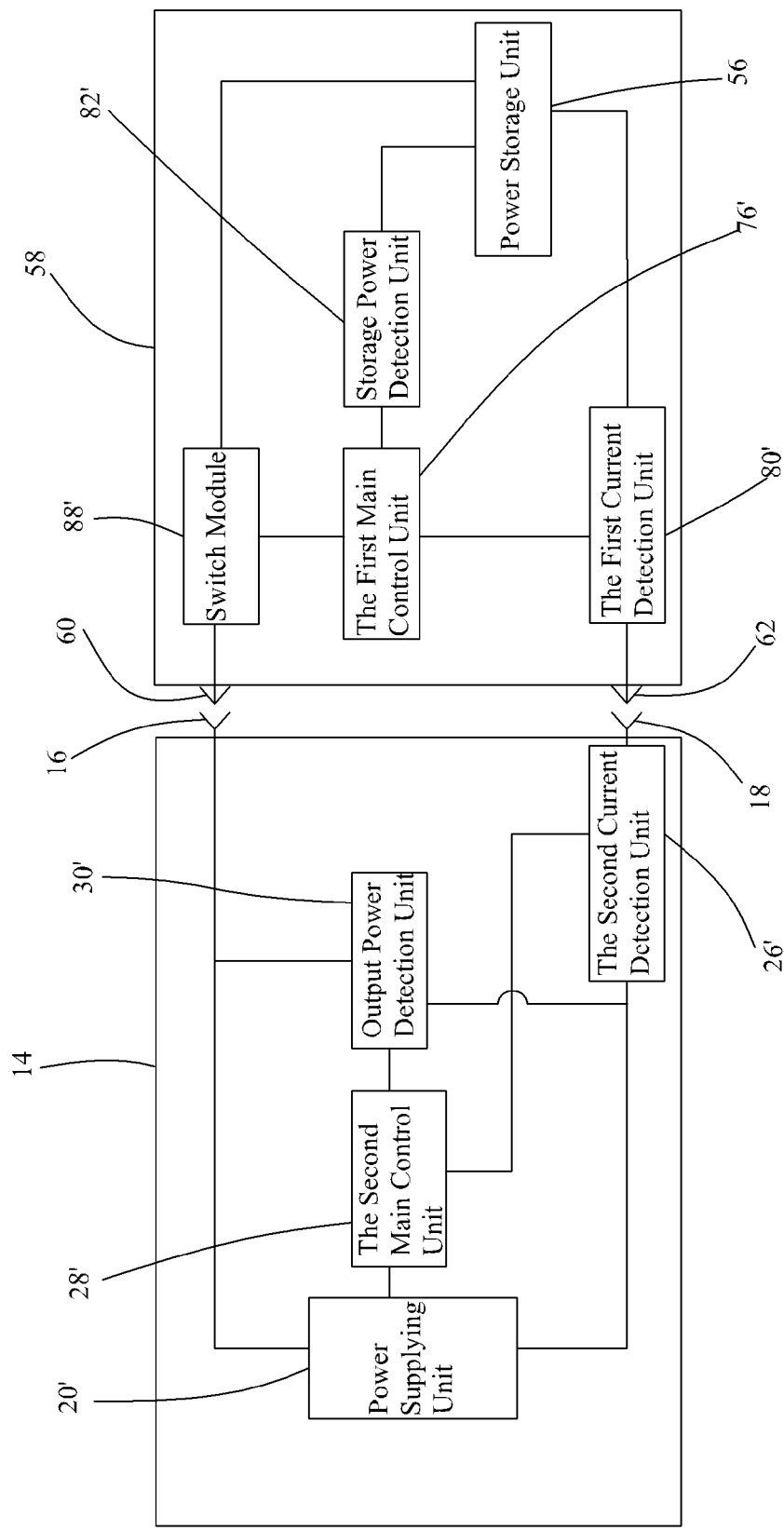
FIG. 7 is a circuit module diagram of the robot and the docking station in the second preferable embodiment of the present invention.

As shown in FIG. 7, the second circuit 14 further comprises a power supplying unit 20', a second main control unit 28', a second current detection unit 26', an output power detection unit 30' and an across circuit 78' (not shown). The power supplying unit 20' acquires power from the external AC power supply through the power wire 12, converts the acquired power into the charging power suitable for charging the power storage unit 56 in the robot 50, and selectively supplies the charging power to or not to the third terminal 16 and the fourth terminal 18 according to the control of the second main control unit 28'. The power supplying unit 20' has two states, supplying the charging power in one state and the zero power in the other state. The second current detection unit 26' detects the current flowing across the third terminal 16 and the fourth terminal 18 and transmits the detected signal to the second main control unit 28'. The output power detection unit 30' detects the power supplied by the power supplying unit 20' to the third terminal 16 and the fourth terminal 18 and transmits the detected signal to the second main control unit 28'. The across circuit 78' is located between the third terminal 16 and the fourth terminal 18 for electrically connecting third terminal 16 and the fourth terminal 18. The current flows towards either the third terminal 16 or the fourth terminal 18 via the across circuit 78' when the other of the two receives the current. The second main control unit 28' is electrically connected with the output power detection unit 30', the power supplying unit 20' and the second current detection unit 26', and controls the power output of the power supplying unit 20' according to the signals transmitted by the power supplying unit 20' and the second current detection unit 26'. The output power detection unit 30' is also located between the third terminal 16 and the fourth terminal 18 and therefore also has functions identical to those of the across circuit 78'. To simplify the circuit structure, the functions of the across circuit 78' are integrated in the output power detection unit 30'. Therefore, only the output power detection unit 30' is provided in FIG. 7.

The first circuit 58 further comprises a first main control unit 76', a first current detection unit 80', a storage power detection unit 82' and a switch module 88'. The switch module 88' is configured for controlling the power transmission from the first terminal 60 and the second terminal 62 to the power storage unit 56. The switch module 88' forbids the power transmission from the first terminal 60 and the second terminal 62 to the power storage unit 56 in the off state and allows the power transmission from the first terminal 60 and the second terminal 62 to the power storage unit 56 in the on state. The storage power detection unit 82' is configured for detecting the current power level of the power storage unit 56 and transmits the detected signal to the first main control unit 76'. The first current detection unit 80' is configured for detecting the current applied by the first terminal 60 and the second terminal 62 to the power storage unit 56 and transmits the current signal to the first main control unit 76'. The first main control unit 76' is electrically connected to the first current detection unit 80', storage power detection unit 82' and switch module 88', and controls the state of the switch module 88' and the moving state of the robot 50 through the signals detected by the first current detection unit 80' and the storage power detection unit 82'.

The robot 50 is provided with many ways for startup and return, such as expiration of the working time, completion of the work, insufficient power, exposure to the rain, forced return, etc., all of which can serve as the conditions of the robot 50 for returning to the docking station 10. When detecting anyone of the above mentioned conditions, the first main control unit 76' controls the robot 50 to return to the docking station 10. The specific implementations are identical to those in the first preferable embodiment and therefore are not described in detail here.

When the robot 50 has started to return to the docking station 10, the first main control unit 76' controls the switch module 88' to keep in the state of allowing the power transmission from the first terminal 60 and the second terminal 62 to the power storage unit 56. In this state, the detection power of the power storage unit 56 is applied to the first terminal 60 and the second terminal 62 through the switch module 88'. Meanwhile, the second main control unit 28' controls the power supplying unit 20' to be in the state of outputting zero power. When the robot 50 docked with the docking station 10, the first group of terminals and the second group of terminals are in corresponding electrical connection. The power storage unit 56, the switch module 88' and the first current detection unit 80' of the first circuit 58 together with the second current detection unit 26' and the output power detection unit 30' of the second circuit 14 form the detection circuit through the first terminal 60, the second terminal 62, the third terminal 16 and the fourth terminal 18. The detection power supplied by the power storage unit 56 flows across the detection circuit to generate the detection current. The detection current is detected by the first current detection unit 80' and the second current detection unit 26' when flowing across the detection circuit. Wherein, the first current detection unit 80' transmits the detected detection current to the first main control unit 76'. The first main control unit 76' confirms that the robot 50 docked with the docking station 10 after receiving the detection current and then controls the robot 50 to stop moving. The second current detection unit 26' transmits the detected detection current to the second main control unit 28'. The second main control unit 28' confirms that the robot 50 docked with the docking station 10 after receiving the detection current and then controls the power supplying unit 20' to supply the charging power to the third terminal 16 and the fourth terminal 18 so as to charge the robot 50. On the contrary, when the robot 50 failed to dock with the docking station 10, the first group of terminals and the second group of terminals are not in corresponding electrical connection, and the detection circuit cannot be formed, so the detection current cannot be generated. Both the first current detection unit 82' and the second current detection unit 26' fail to detect the detection current. In this state, both the first main control unit 76' and the second main control unit 28' do not confirm that the first group of terminals of the robot 50 docked with the second group of terminals of the docking station 10. The first main control unit 76' controls the robot 50 to move continuously to find the docking station 10. The second main control unit 28' controls the power supplying unit 20' still to keep outputting zero power, thus reducing power consumption of the docking station 10.

After charging begins, the second current detection unit 26' of the docking station 10 detects the charging current applied by the power supplying unit 20' to the third terminal 16 and the fourth terminal 18 at any time. Once the charging current is detected to be less than a predetermined current value, the second main control unit 28' forbids the power supplying unit 20' from supplying the charging power to the third terminal 16 and the fourth terminal 18, thus stopping charging of the robot 50. Meanwhile, the first current detection unit 80' of the robot 50 detects the charging current applied by the first terminal 60 and the second terminal 62 to the power storage unit 56 at any time, and transmits the detected signal to the first main control unit 76'. Once detecting that the charging current is less than a predetermined current value, the first main control unit 76' controls the switch module 88' to be switched from the on state into the off state, thus terminating power transmission from the first terminal 60 and the second terminal 62 to the power storage unit 56. Expect for the method of detecting the charging current by the first current detection unit 80' to judge whether to forbid the power transmission, the first main control unit 76' also can judge whether to charge continuously through detecting the current power level of the power storage unit 56 by the storage power detection unit 82'. Moreover, the first main control unit 76' also can judge whether the charging time exceeds a predetermined value by the method of being internally provided with a timer, thus controlling the power transmission. The first main control unit 76' also can judge whether to forbid the power transmission through detecting the internal information of the power storage unit 56, e.g.: detecting the internal temperature of the power storage unit 56. The first main control unit 76' forbids the power transmission from the first terminal 60 and the second terminal 62 to the power storage unit 56 when the internal temperature of the power storage unit 56 exceeds a predetermined temperature scope, thereby terminating charging the power storage unit 56. The first main control unit 76' judges that there is need to forbid the power transmission through anyone of the above mentioned ways, controls the switch module 88' to be in the off state and therefore forbids the power transmission from the first terminal 60 and the second terminal 62 to the power storage unit 56. The charging process ends, and then the robot 50 returns to the working area 102 again to work continuously.

In the process of confirming that the first group of terminals of the robot 50 docked with the second group of terminals of the docking station 10, charging is started through confirming once that the robot 50 docked with the docking station 10. In an actual situation, the first group of terminals and the second group of terminals may be separated after the robot 50 stops moving because of the difference in time when the detection current is detected and when the robot 50 is controlled to stop moving, so the first current detection unit 80' and the second current detection unit 26' fail to detect the detection current while charging has been started. In such circumstance, the first current detection unit 80' and the second current detection unit 26' detect zero current, resulting in the first main control unit 76' and the second main control unit 28' making a wrong conclusion that the charging current is less than the predetermined current value, then stop charging and control the robot 50 to return to the working area 102 again to work. To prevent the abovementioned situation, the first main control unit 76' and the second main control unit 28' are configured to confirm twice that the first group of terminals of the robot 50 docked with the second group of terminals of the docking station 10. The process of twice confirming the docking is identical to that in the first preferable embodiment and therefore is not described in detail here.

Figure 8:
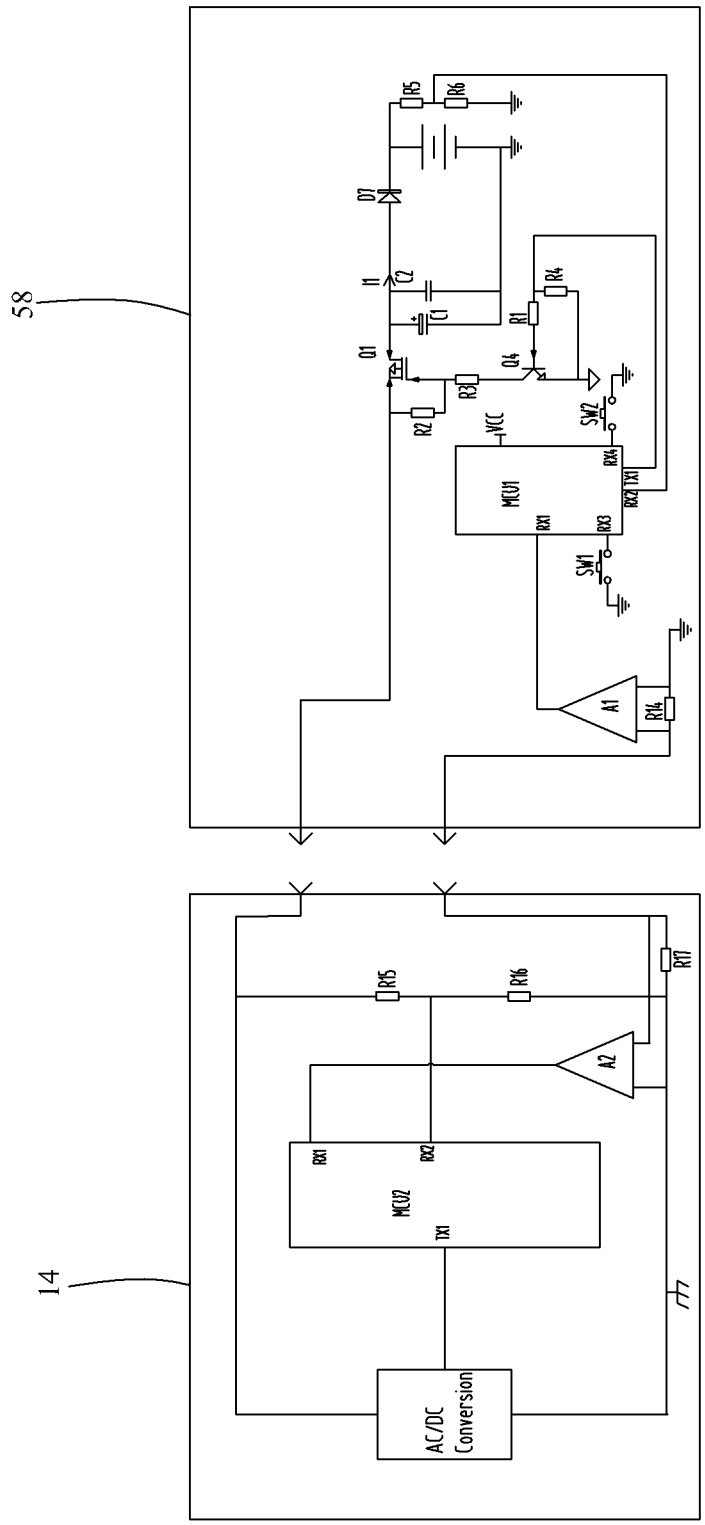
FIG. 8 is a circuit frame diagram of the robot and the docking station as shown in FIG. 7.

FIG. 8 shows the composition of each of the functional units of the second circuit 14 and the first circuit 58, wherein the storage power detection unit 82', the switch module 88', the first main control unit 76', the first current detection unit 80', the output power detection unit 30', the second current detection unit 26' and the second main control unit 28' all are identical to those in the first preferable embodiment. The power supplying unit 20' in the second embodiment differs from the power supplying unit 20 in the first preferable embodiment in power output. The power supplying unit 20' outputs the charging power and the zero power, wherein the zero power is a non-charging power less than the detection power. In this state, output of the detection power does not exist, which means that the detection power is supplied by the power storage unit 56 instead of the power supplying unit 20'. The detailed structures of each of the modules are not repeatedly described here. Those skilled in the art can realize the scheme of this embodiment with reference to the FIG. 7 and the description of the first preferable embodiment.

The functions, specific structure, and mutual influences of each of the functional units of the second circuit 14 and the first circuit 58 are described in detail with reference to the circuit frame diagram in the aforementioned part. The following are the detailed descriptions of docking and charging between the robot 50 and the docking station 10 with reference to the workflow charts of the microcontroller MCU1 composing the first main control unit 76' and the microcontroller MCU2 composing the second main control unit 28'.

Figure 9:
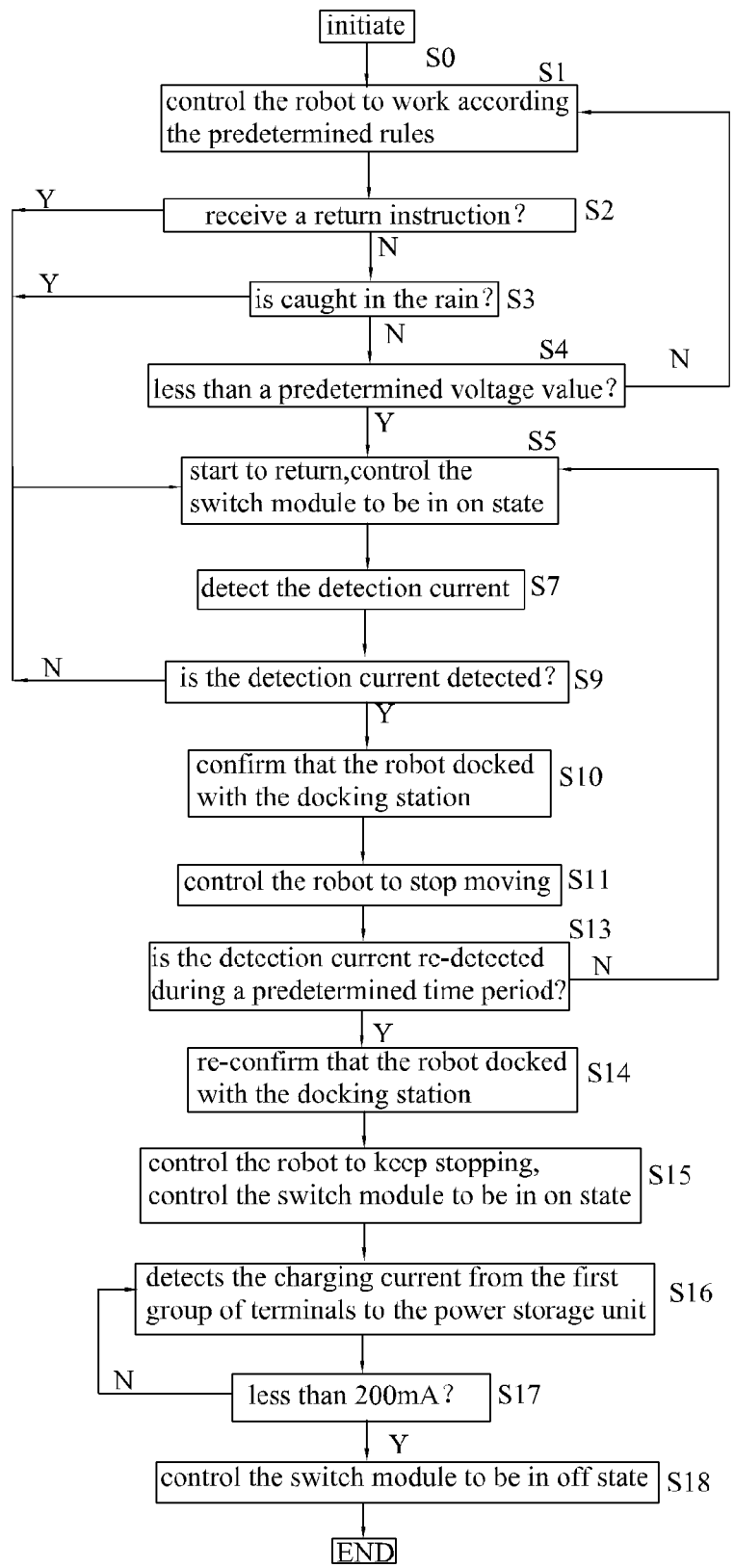
FIG. 9 is a workflow chart of the robot as shown in FIG. 8.

FIG. 9 shows the workflow of the microcontroller MCU1. After the robot 50 has started to work, execute step S0: initiate. After initiating is completed, execute step S1: control the robot 50 to work according to the predetermined rules in the working area 102 defined by the boundary wire 100. Then, execute step S2: judge if the user outputs a return instruction through the forced return assembly 90. If the judgment result is yes, turn to step S5. If the judgment result is no, execute step S3: judge if the robot 50 is caught in the rain through the signal transmitted by the rain detection unit 92. If the judgment result is yes, turn to step S5. If the judgment result is no, execute step S4: judge if the voltage of the power storage unit 56 detected by the storage power detection unit 82' is less than a predetermined voltage value. If the judgment result is no, return to step S1. If the judgment result is yes, execute step S5: control the robot 50 to return to the docking station 10 along the boundary wire 100 and the switch module 88' to be switched from the off state into the on state, and then the detection power from the power storage unit 56 is applied to the first terminal 60 and the second terminal 62 through the switch module 88'. Execute step S7: detect the detection current flowing across the first terminal 60 and the second terminal 62. Execute step S9: further judge if the detection current is detected. When the first group of terminals and the second group of terminals are in corresponding electrical connection, the power storage unit 56, the first current detection unit 80' and the switch module 88' of the first circuit 58 together with the output power detection unit 30' and the second current detection unit 26' of the second circuit 14 form the detection circuit through the first group of terminals and the second group of terminals. The detection power supplied by the power storage unit 56 flows across the detection circuit to generate the detection current. At this moment, the judgment result of step S9 is yes, then execute step S10: confirm that the first group of terminals of the robot 50 docked with the second group of terminals of the docking station 10. Then, execute step S11: control the robot 50 to stop moving. On the contrary, when the first group of terminals and the second group of terminals are not in corresponding in electrical connection, the detection circuit cannot be formed, and therefore the detection current cannot be generated. At this moment, the judgment result is no, and then return to step S5. After step S11, execute step S13: continuously detect the detection current flowing across the first terminal 60 and the second terminal 62 and judge if the detection current is detected again in the predetermined time period. If the judgment result is no, this means that docking failed, and then return to step S5 to control the robot 50 to start moving and try to dock again. If the judgment result is yes, execute step S14: re-confirm that the first group of terminals of the robot 50 docked with the second group of terminals of the docking station 10. Execute step S15: control the robot 50 to keep stopping, and wait for the docking station 10 to start charging. The workflow of the microcontroller MCU1 may not include the step S13 and the step S14. Here, the objective of adding those two steps is to strengthen the anti-interference when the microcontroller MCU1 is started and waits for charging.

Figure 10:
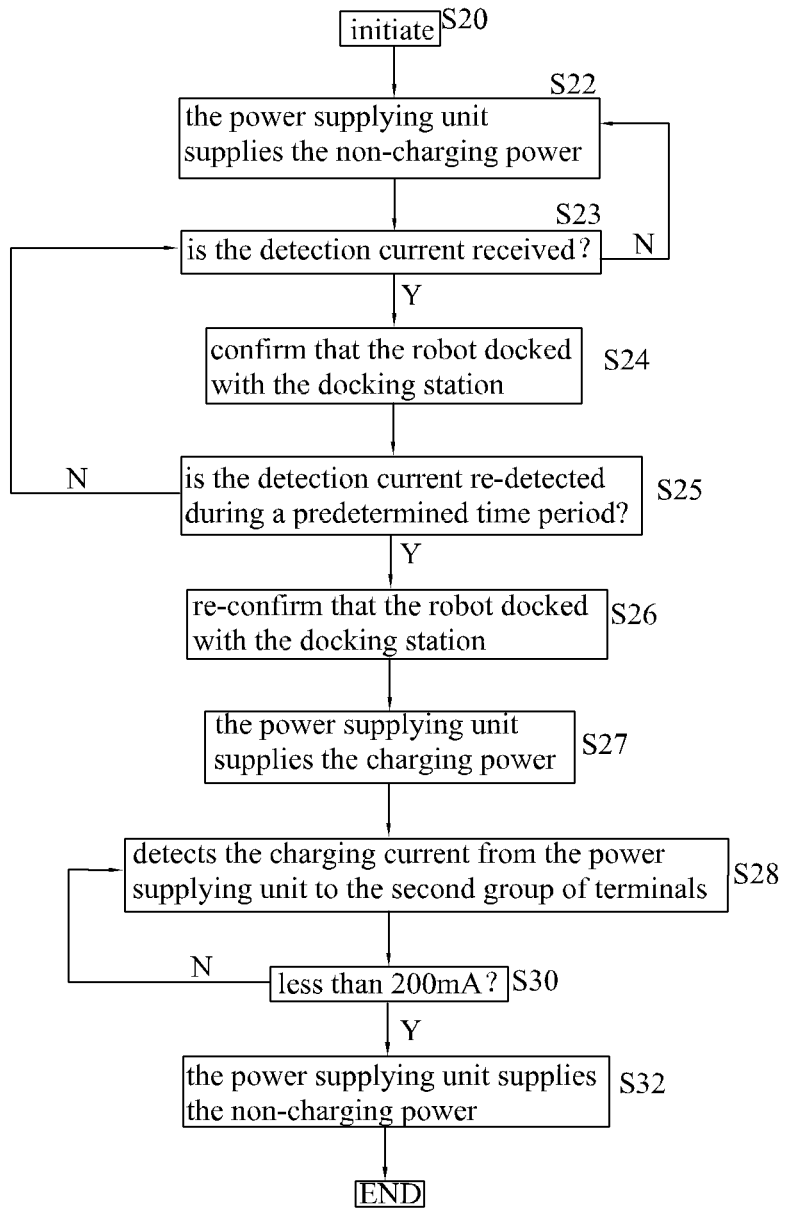
FIG. 10 is a workflow chart of the docking station as shown in FIG. 8.

FIG. 10 shows the workflow of the microcontroller MCU2. After the docking station 10 is connected with the external power supply, execute step S20: initiate. Execute step S22: control the power supplying unit 20' to keep outputting zero power. Execute step S23: judge if the detection current is received. When the second group of terminals and the first group of terminals are in corresponding electrical connection, the power storage unit 56, the first current detection unit 80' and the switch module 88' of the second circuit 58 together with the output power detection unit 30' and the second current detection unit 26' of the first circuit 14 form the detection circuit. The detection circuit flows across the detection circuit to generate the detection current which is detected by the first current detection unit 80' and the second current detection unit 26' at the same time. The second current detection unit 26' transmits the detected detection current to the second main control unit 28'. After the second main control unit 28' receives the detection current, execute step S24: confirm that the first group of terminals of the robot 50 docked with the second group of terminals of the docking station 10. Then, execute step S25: continuously judge if the detection current is detected again in the predetermined time period without other action. If the judgment result is no, execute step S23: continuously judge if the detection current is received. If the judgment result is yes, execute step S26: confirm that the first group of terminals of the robot 50 docked with the second group of terminals of the docking station 10 again. Then, execute step S27: start the docking station 10 to charge and control the power supplying unit 20' to output the charging power to the third terminal 16 and the fourth terminal 18. The workflow of the microcontroller MCU2 may not include the step S25 and the step S26. Here, the objective of adding those two steps is to strengthen the anti-interference when the microcontroller MCU2 is started to charge.

After the docking station 10 is started to charge, execute step S27: control the power supplying unit 20' to output the charging power to the third terminal 16 and the fourth terminal 18. Then, execute step S28: detect the charging current supplied by the power supplying unit 20' to the third terminal 16 and the fourth terminal 18 through the second current detection unit 26'. Then, execute step S30: judge if the charging current is less than 200 mA. If the judgment result is no, return to step S28. If the judgment result is yes, execute step S32: forbid the power supplying unit 20' from outputting the charging power the third terminal 16 and the fourth terminal 18, thus terminating charging the robot 50 by the docking station 10. Both the microcontroller MCU2 and the microcontroller MCU1 detect and control the charging process during charging. See FIG. 9, in step S16, the microcontroller MCU1 detects the charging current from the first terminal 60 and the second terminal 62 to the power storage unit 56 after confirming that the first group of terminals of the robot 50 docked with the second group of terminals of the docking station 10. In step S17, the microcontroller MCU1 further judges if the charging current is less than a predetermined current value 200 mA, if not, returns to step S16, and if so, executes step S18: control the switch module 88' to be switched from the on state into the off state to forbid the power transmission from the first terminal 60 and the second terminal 62 to the power storage unit 56. Then, charging the robot 50 by the docking station 10 is terminated.

In the above two embodiments, the first circuit 58 and the second circuit 14 form the detection circuit through the first group of terminals and the second group of terminals when the robot 50 docked with the docking station 10. The first circuit 58 includes the power storage unit 56 and the first main control unit (76, 76') controlling the robot's moving. The second circuit 14 comprises the power supplying unit (20, 20') and the second main control unit (28, 28') controlling the power supplying unit's power output. The detection power supplied by the power storage unit 56 or the power supplying unit (20, 20') flows across the detection circuit to generate the detection current. The second main control unit (28, 28') controls the power supplying unit (20, 20') to output the charging power when detecting the detection current through the second current detection unit (26, 26') in the second circuit 14. On the contrary, the second main control unit (28, 28') controls the power supplying unit (20, 20') to output non-charging power when failing to detect the detection current through the second current detection unit (26, 26'). Specifically, the non-charging power is equal to the detection power when the detection power is supplied by the power supplying unit (20, 20') and is less than the detection power when the detection power is supplied by the power storage unit 56. Meanwhile, the first main control unit (76, 76') controls the robot 50 to stop moving when the first current detection unit (80, 80') in the detection circuit that is located at the first par circuit 58 detects the detection current. On the contrary, the first main control unit (76, 76') controls the robot 50 continuously seeking the docking station 10 when the first current detection unit (80, 80') fails to detect the detection current. Those skilled in the art can understand that, the detection circuit may also have either the second current detection current (26, 26') or the first current detection unit (80, 80') to realize the present invention. In the case that the detection circuit only has the second current detection current (26, 26'), the second current detection current (26, 26') transmits the detected signal to the second main control unit (28, 28') and transmits the detected signal to the first main control unit (76, 76') through another terminal or in a wireless way at the same time. The second main control unit (28, 28') and the first main control unit (76, 76') execute operations identical to that in the abovementioned embodiments when receiving the signals from the second current detection current (26, 26'). In the case that the detection circuit only has the first current detection unit (80, 80'), the realization way is identical to that of the case that only has the second current detection current (26, 26').

In the above two embodiments, the second main control unit (28, 28') controls the power supplying unit (20, 20') to output non-charging power before the robot 50 docked with the docking station 10 and to output the charging power after the robot 50 docked with the docking station 10. The docking station 10 outputs the lower non-charging power first and then outputs the higher charging power after docking, thus effectively reducing the power consumption of the docking station 10 and lowering the risks of touching the docking station 10 for the human body.

The present invention also provides a third embodiment which differs from the first and second preferable embodiments in that, the power supplying unit always outputs the charging power after or before the second group of terminals of the docking station 10 docked with the first group of terminals of the robot 50 and does not judge whether to output the charging power according to the signal that identifies whether the second group of terminals docked with the first group of terminals. The third embodiment is described below in further detail with reference to FIGS. 11-13.

Figure 11:
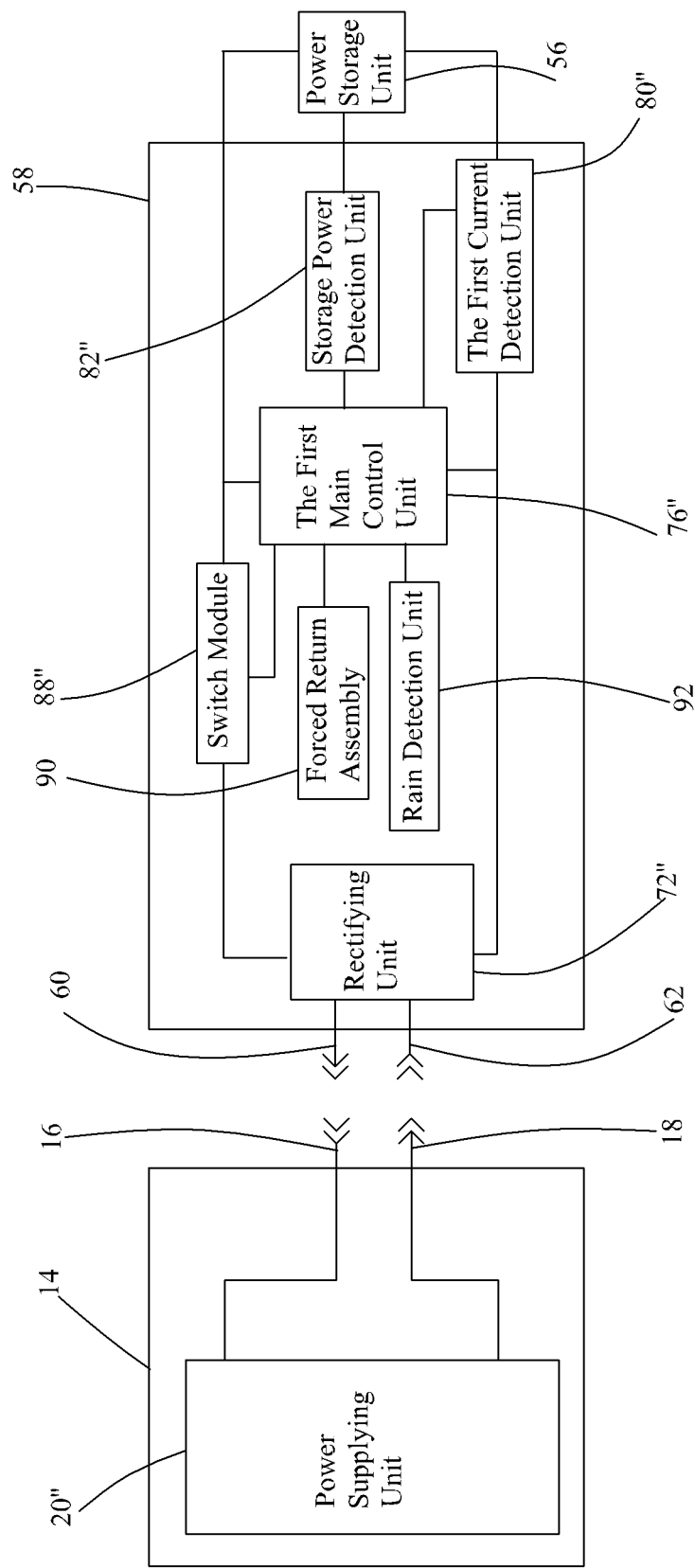
FIG. 11 is a circuit module diagram of the robot and the docking station in the third preferable embodiment of the present invention.

As shown in FIG. 11, the second circuit 14 further comprises a power supplying unit 20" configured for supplying the detection power to the third terminal 16 and the fourth terminal 18. In the third embodiment, the detection power is not the non-charging power, but the charging power. The power supplying unit 20" acquires power from the external AC power supply through the power wire 12 and converts the power into the power that is suitable for charging mode of the power storage unit 56 in the robot 50 and applied to the third terminal 16 and the fourth terminal 18. When the first terminal 60 and the second terminal 62 are respectively electrically connected with the third terminal 16 and the fourth terminal 18, the power of the power supplying unit 20" can be applied to the power storage unit 56.

The first circuit 58 further comprises a first main control unit 76", a first current detection unit 80", a storage power detection unit 82", a switch module 88" and a rectifying unit 72". The switch module 88" configured for controlling the power transmission from the first terminal 60 and the second terminal 62 to the power storage unit 56. The switch module 88" forbids the power transmission from the first terminal 60 and the second terminal 62 to the power storage unit 56 in the off state and allows power transmission from the first terminal 60 and the second terminal 62 to the power storage unit 56 in the on state. The storage power detection unit 82" is configured for detecting the current power level of the power storage unit 56 and transmits the detected signal to the first main control unit 76". The first current detection unit 80" is configured for detecting the current applied by the first terminal 60 and the second terminal 62 to the power storage unit 56 and transmits the detected signal to the first main control unit 76". The first main control unit 76" is electrically connected with the first current detection unit 80", the storage power detection unit 82" and the switch module 88" and controls the state of the switch module 88" according to the signals detected by the first current detection unit 80" and the storage power detection unit 82". The rectifying unit 72" is provided with a positive input end, a negative input end, a positive output end and a negative output end. The positive input end is electrically connected with the first terminal 60. The negative output end is electrically connected with the second terminal 62. The positive output end is electrically connected with the positive electrode of the power storage unit 56. The negative output end is electrically connected with the negative electrode of the power storage unit 56. Therefore, for any change the corresponding relation of connection between the first group of terminals constituted by the first terminal 60 and the second terminal 62 and the second group of terminals constituted by the third terminal 16 and the fourth terminal 18, the positive electrode of the charging power transmitted by the third terminal 16 and the fourth terminal 18 is always electrically connected with the positive electrode of the power storage unit 56, while the negative electrode of the charging power is always electrically connected with the negative electrode of the power storage unit 56, thus effectively preventing the situation that change of the corresponding relation of connection between the first group of terminals constituted by the first terminal 60 and the second terminal 62 and the second group of terminals constituted by the third terminal 16 and the fourth terminal 18 results in direction change of the current transmitted from the first terminal 60 and the second terminal 62 to the robot 50 and therefore causes damage to the internal components of the robot 50.

The first circuit 58 and the second circuit 14 form the detection circuit through the corresponding electrical connection between the second group of terminals constituted by the third terminal 16 and the fourth terminal 18 and the first group of terminals constituted by the first terminal 60 and the second terminal 62. The detection circuit is a closed circuit constituted by the power supplying unit 20", the third terminal 16, the fourth terminal 18, the first terminal 60, the second terminal 62, the rectifying unit 72", the first current detection unit 80", the switch module 88", and the power storage unit 56. The detection power provided by the power supplying unit 20" flows across the detection circuit to generate the detection current. In this state, the first current detection unit 80" can detect the detection current, and transmit the detected detection current to the first main control unit 76". The first main control unit 76" confirms the that the third terminal 16 and the fourth terminal 18 are respectively in corresponding electrical connection with the first terminal 60 and the second terminal 62 after detecting the detection current, and then confirms that the first group of terminals of the robot 50 docked with the second group of terminals of the docking station 10. In the case that the third terminal 16 and the fourth terminal 18 are not respectively in corresponding electrical connection with the first terminal 60 and the second terminal 62, the detection circuit cannot be formed, and the detection power supplied by the power supplying unit 20" cannot flow across the detection circuit, so the first current detection unit 80" fails to detect the detection current, which means that the first current detection unit 80" detects zero current. In the case that the first current detection unit 80" detects zero current, the first main control unit 76" confirms that the third terminal 16 and the fourth terminal 18 are not respectively in corresponding electrical connection with one or two of the first terminal 60 and the second terminal 62 and then does not confirm that the first group of terminals of the robot 50 docked with the second group of terminals of the docking station 10.

The first main control unit 76" controls the robot 50 to return to the docking station 10 and the switch module 88" to be in the sate of allowing the power transmission from the first terminal 60 and the second terminal 62 to the power storage unit 56 after detecting the return conditions. In the returning process, the first current detection unit 80" detects the current applied by the first terminal 60 and the second terminal 62 to the power storage unit 56 at any time. Before the third terminal 16 and the fourth terminal 18 docked with the first terminal 60 and the second terminal 62, the first current detection unit 80" fails to detect the detection current. After third terminal 16 and the fourth terminal 18 docked with the first terminal 60 and the second terminal 62, the first circuit 58 and the second circuit 14 form the detection circuit through the first group of terminals and the second group of terminals, and the detection power supplied by the power supplying unit 20" flows across the detection circuit to generate the detection current. In this state, the first current detection unit 80" detects the detection current. Once the first current detection unit 80" detects the detection current, the first main control unit 76" confirms that the third terminal 16 and the fourth terminal 18 are respectively in corresponding electrical connection with the first terminal 60 and the second terminal 62 and then confirms that the first group of terminals of the robot 50 docked with the second group of terminals of the docking station 10. At this moment, the first main control unit 76" controls the robot 50 to stop moving, and the docking station 10 supplies the charging power by the power supplying unit 20" to charge the power storage unit 56 of the robot 50 via the charging circuit. Charging is started. The charging circuit is a closed circuit consisting of the power supplying unit 20", the third terminal 16, the fourth terminal 18, the first terminal 60, the second terminal 62, the rectifying unit 72", the first current detection unit 80", the switch module 88", and the power storage unit 56, identical to the detection circuit in constitution. Here, it should be noted that the detection power in the third embodiment is the charging power, and the detection current is the charging current because the detection circuit is identical to the charging current. In the third embodiment, the docking process and charging process are distinguished in the following way. In the docking process, the power supplied by the power supplying unit 20" is described as the detection power, while the current generated when the power supplied by the power supplying unit 20" flows across the detection loop is described as the detection current; after docking and in the process of starting charging, the power supplied by the power supplying unit 20" is described as the charging power, and the current generated when the power supplied by the power supplying unit 20" flows across the charging loop is described as the charging current.

In the third embodiment, the detection power supplied by the power supplying unit 20" is preferably always applied to the third terminal 16 and the fourth terminal 18; even if the robot 50 does not dock with the docking station 10, the third terminal 16 and the fourth terminal 18 output the detection power. This scheme has the advantages of simple structure and reliable performance. As a modified scheme of the preferable scheme, the detection power supplied by the power supplying unit 20" of the docking station 10 is usually not applied to the third terminal 16 and the fourth terminal 18; and only when the robot 50 is detected to be close to the docking station 10 can the detection power supplied by the power supplying unit 20" be applied to the third terminal 16 and the fourth terminal 18. This modified scheme has the advantages of being more electrically economic and being safer. This modified scheme may be realized in the following way: the robot 50 and the docking station 10 are respectively provided with a sensing component. When the robot 50 is close to the docking station 10, the sensing components act, and then the docking station 10 controls the power supplying unit 20" to apply detection power to the third terminal 16 and the fourth terminal 18. The sensing components may be diversified, e.g.: the docking station 10 is internally provided with a reed pipe, and the robot 50 is internally provided with magnetic steel. When the robot 50 is close to the docking station 10, the magnetic steel enables the reed pipe to switch from the off state into the on state. The docking station 10 detects the state change of the reed pipe and then controls the power supplying unit 20" to apply the detection power to the third terminal 16 and the fourth terminal 18.

After charging is started, the first current detection unit 80" of the robot 50 detects the charging current applied by the first terminal 60 and the second terminal 62 to the power storage unit 56 at any time and transmits the detected signal to the first main control unit 76". The first main control unit 76' controls the switch module 88" to terminate the power transmission from the first terminal 60 and the second terminal 62 to the power storage unit 56 once detecting that the charging current is less than a predetermined value. Except for the method of judging whether to forbid power transmission through detecting the charging current by the first current detection unit 80", the first main control unit 76" also can judge whether to continue charging through detecting the current power level of the power storage unit 56 by the storage power detection unit 82". In addition, the first main control unit 76" also can judge whether the charging time exceeds a predetermined value in a way of being internally provided with a timer, thereby controlling the power transmission. The first main control unit 76" also can judge whether to forbid the power transmission through detecting the internal information of the power storage unit 56, e.g.: detecting the internal temperature of the power storage unit 56. When the internal temperature of the power storage unit 56 exceeds a predetermined temperature scope, the first main control unit 76" forbids the power transmission from the first terminal 60 and the second terminal 62 to the power storage unit 56, thereby terminating charging the power storage unit 56. The first main control unit 76" judges that there is need to forbid the power transmission through anyone of the above mentioned ways, controls the switch module 88" to be in the off state and therefore forbids the power transmission from the first terminal 60 and the second terminal 62 to the power storage unit 56. The charging process ends, and then the robot 50 returns to the working area 102 again to work continuously.

In the process of confirming that the first group of terminals of the robot 50 docked with the second group of terminals of the docking station 10, charging is started through confirming once that the robot 50 docked with the docking station 10. In an actual situation, the first group of terminals and the second group of terminals may be separated after the robot 50 stops moving because of the difference in time when the detection current is detected and when the robot 50 is controlled to stop moving. At this moment, the first current detection unit 80" fails to detect the detection current. In such circumstance, the first main control unit 76" confirms that the charging process ends because the first current detection unit 80" detects that the current is less than the predetermined value, and then controls the robot 50 to return to the working area 102 again to work. To prevent the abovementioned situation, the first main control unit 76" is configured to confirm twice that the first group of terminals of the robot 50 docked with the second group of terminals of the docking station 10. The first main control unit 76" controls the robot 50 to stop moving after confirming for the first time that the first group of terminals of the robot 50 docked with the second group of terminals of the docking station 10. Then, the first main control unit 76" confirms if the first current detection unit 80" continuously detects the detection current applied by the first terminal 60 and the second terminal 62 to the power storage unit 56 in the predetermined time period, if so, re-confirm that first group of terminals of the robot 50 docked with the second group of terminals of the docking station 10, and controls the robot 50 keeping still from the startup of the charging to the end of the charging. If the first current detection unit 80" fails to detect the detection current in the predetermined time period, the first main control unit 76" controls the robot 50 to start moving and try to dock again, repeating the above mentioned process of confirming that the first group of terminals of the robot 50 docked with the second group of terminals of the docking station 10. The whole detection response process is short in time, so the predetermined time period is general short. The predetermined time period is set to be 2S in the third embodiment. The detected detection current may be identical or different in the process of confirming twice that first group of terminals of the robot 50 docked with the second group of terminals of the docking station 10.

To overcome the shortcomings of human intervention, the robot 50 is provided with many ways for starting to return, such as expiration of the working time, completion of the work, insufficient power, exposure to the rain, forced return, etc. All of those ways can serve as the conditions of the robot 50 for returning to the docking station 10. When detecting anyone of the above mentioned conditions, the first main control unit 76" controls the robot 50 to return to the docking station 10. The specific implementations are identical to those in the first preferable embodiment and therefore are not described in detail here.

Figure 12:
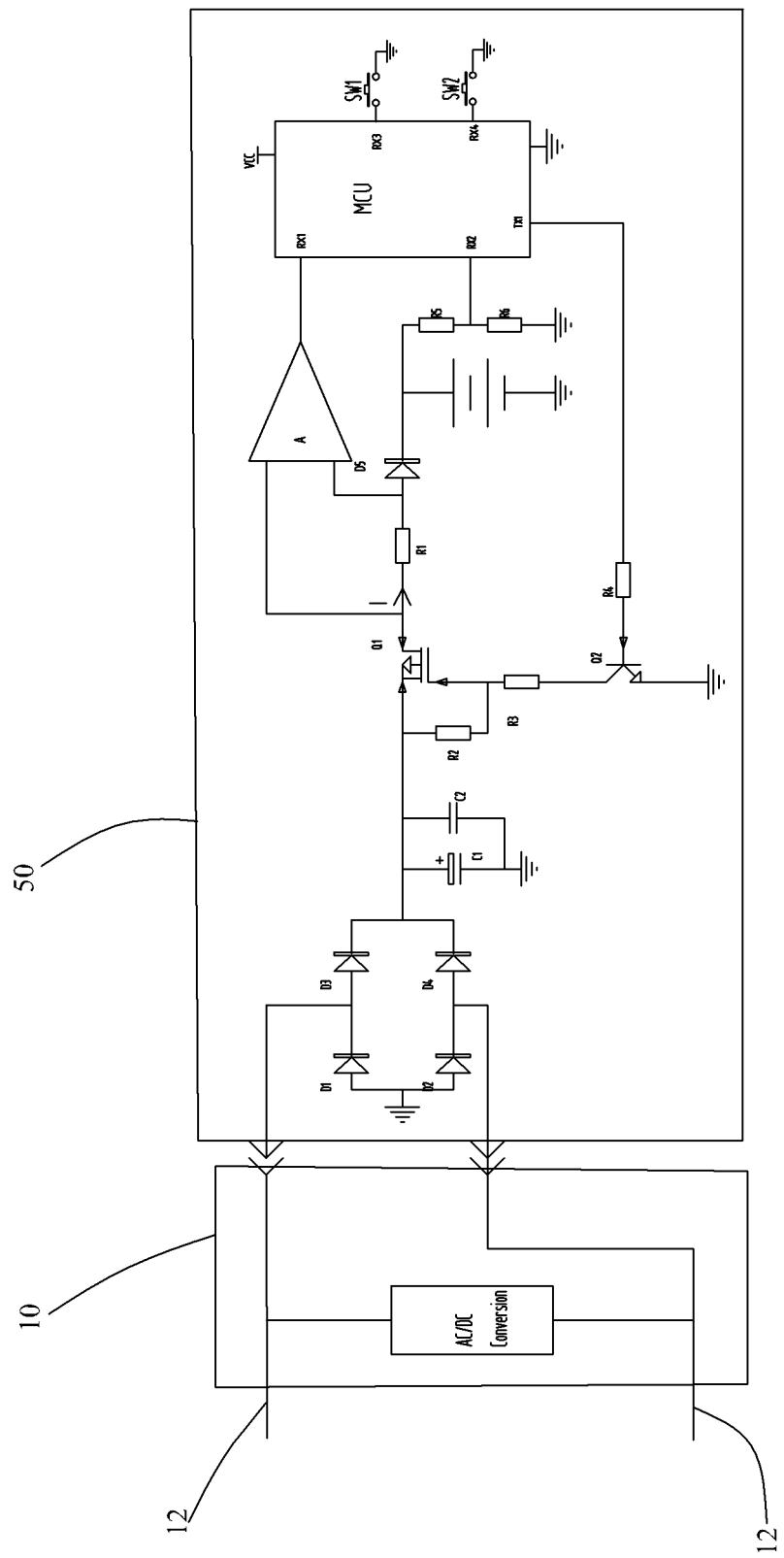
FIG. 12 is a circuit frame diagram of the robot and the docking station as shown in FIG. 11

The components and working mode of each of the functional units of the second circuit 14 and the first circuit 58 are described in detail with reference to FIG. 12. The functional units of the first circuit 58 go first.

The first main control unit 76" is mainly configured for receiving and judging signals, generating control signals according to the signal judgment result, etc. Based on the mentioned function needs, the first main control unit 76" can be set as the analogue circuit, digital circuit, or combination of the analogue circuit and the digital circuit. In the third embodiment, the first main control unit 76" is a microcontroller MCU, namely the integrated circuit well-known for those skilled in the art to execute the related actions and realize corresponding functions through compiling predetermined programs. The corresponding functions at least include detection, identification, judgment, generation and transmission of signals, timing and calculation. The microcontroller MCU further comprises signal receiving ports RX1, RX2, RX3, RX4 and a signal transmitting port TX1. The signal receiving portion RX1 is electrically connected with the first current detection unit 80" for receiving the current signal transmitted from the first current detection unit 80". The signal receiving port RX2 is electrically connected with the storage power detection unit 82" for receiving the signal from the storage power detection unit 82" that identifies the current power level of the power storage unit 56. The signal receiving port RX3 is respectively electrically connected with the forced return assembly 90 for receiving the signal from the forced return assembly 90. The signal receiving port RX4 is electrically connected with the rain detection unit 92 for receiving the signal from the rain detection unit 92. The signal transmitting port TX1 is electrically connected with the switch module 88" for transmitting the control signal to the switch module 88" to control the power transmission from the first terminal 60 and the second terminal 62 to the power storage unit 56. The first main control unit 76" controls the signal output of the signal transmitting port TX1 according to the signals received by the signal receiving ports RX1, RX2, RX3 and RX4.

The storage power detection unit 82" is mainly configured for detecting the power of the power storage unit 56 when the robot 50 works and is charged, and transmits the detected signal to the signal receiving port RX2. When the robot 50 works, the microcontroller MCU judges whether the power of the power storage unit 56 exceeds a certain predetermined value according to the received signals so as to judge whether the robot 50 is required to return to the docking station 10 to be charged. When the robot 50 is charged, the microcontroller MCU judges the power of the power storage unit 56 exceeds a certain predetermined value according to the received signals so as to judge whether to terminate charging through the switch module 88". The specific implementations are identical to those in the first preferable embodiment and therefore are not described in detail here.

The forced return assembly 90 is mainly configured for quickly responding to user's charging needs and feeding back the needs in the form of electric signal to the microcontroller MCU. This function can be realized by many ways, such as sensing the user's voice, touch, etc. Compared with the method of sensing the user's voice, the method of sensing the user's touch is simpler, so the latter is adopted in the third embodiment. Based on the method of sensing the user's touch, the forced return assembly 90 can be set as the normally open switch or trigger switch, specifically as the trigger switch. As shown in FIG. 12, the switch SW1 has one end electrically connected with the negative electrode of the power storage unit 56 and one end electrically connected with the signal receiving port RX3 of the first main control unit 76". Usually, the signal receiving port RX3 is in the high resistance state. Once the user presses to close the switch SW1, the signal receiving port RX3 can receive a low level. The first main control unit 76" responds to the low level received by the signal receiving port RX3 and controls the robot 50 to return to the docking station 10 for charging the power storage unit 56.

The rain detection unit 92 is configured for detecting if the rain water leaks into the robot 50, and if so, transmits the detected signal to the first main control unit 76" through the signal receiving port RX4. The first main control unit 76" controls the robot 50 to return to the docking station 10 to take shelter from the rain, thereby preventing the rain water from corroding the robot 50. The rain detection unit 92 can be realized through two mutually isolated metal sheets, once electrically connected with the signal receiving port RX4 of the microcontroller MCU, and the other electrically with the negative electrode of the power storage unit 56. In the case of no rain water, the two metal sheets keep mutually isolated, and the signal receiving port RX4 is suspended. In the case of exposure to the rain, the two metal sheets are connected mutually through the rain water. The signal receiving port RX4 receives a low level signal and the microcontroller MCU controls the robot 50 to return to the docking station 10 to take shelter from the rain. The two metal sheets function as a switch, so the rain detection unit 92 in FIG. 12 is represented by the switch SW2.

When the robot 50 returns to the docking station 10 and when the robot 50 is charged, the first current detection unit 80" is mainly configured for detecting the current applied by the first terminal 60 and the second terminal 62 to the power storage unit 56 and transmitting the detected charging current to the first main control unit 76". The robot 50 judges if the first group of terminals of the robot 50 docked with the second group of terminals of the docking station 10 according to the signal that identifies whether the first current detection unit 80" detects the detection current in the returning process and judges whether to terminate charging according to the signal that identifies whether the charging current detected by the first current detection unit 80" is less than a predetermined value in the charging process. Aiming at the functions of the first current detection unit 80", the first current detection unit 80' can be set in many forms. In the third embodiment, the first current detection unit 80" is realized by adopting the micro-resistor and the computing amplifier which are well-known for those skilled in the art. As shown in FIG. 12, the first current detection unit 80" comprises a micro-resistor R1 located between the first terminal 60 and the positive electrode of the power storage unit 56, and a computing amplifier A which amplifies the voltage applied to the micro-resistor R1 and transmits the amplified signal to the signal receiving port RX1. After detecting the voltage applied to the micro-resistor R1 through the signal receiving port RX1, the microcontroller MCU performs corresponding computation to judge the charging current flowing across the micro-resistor R1 and then obtains the current applied by the first terminal 60 and the second terminal 62 to the power storage unit 56. When the third terminal 16 and the fourth terminal 18 are respectively in corresponding electrical connection with the first terminal 60 and the second terminal 62, the power supplied by the power supplying unit 20" to the first terminal 60 and the second terminal 62 through the third terminal 16 and the fourth terminal 18 and further to the power storage unit 56 through the first current detection unit 80". At this moment, the first current detection unit 80" detects the detection current, and the first main control unit 76" confirms that the first group of terminals of the robot 50 docked with the second group of terminals of the docking station 10. When the third terminal 16 and the fourth terminal 18 are separated from one or two of the first terminal 60 and the second terminal 62, no current is supplied to the power storage unit 56, so the first current detection unit 80" fails to detect the detection current and the first main control unit 76" does not confirm that the first group of terminals of the robot 50 docked with the second group of terminals of the docking station 10. As mentioned above, the first current detection unit 80" is configured not only for detecting and feeding back the detection current to the first main control unit 76" to judge whether the first group of terminals of the robot 50 docked with the second group of terminals of the docking station 10 in the docking process, but also for detecting and feeding back the charging current to the first main control unit 76" to judge whether to terminate charging in the charging process. In the docking process, the first main control unit 76" is configured for detecting the detection current and then judging that the third terminal 16 and the fourth terminal 18 are respectively in electrical connection with the first terminal 60 and the second terminal 62. In the charging process, the first main control unit 76" is configured for transmitting a signal to the switch module 88" to terminate charging when the detected charging current is less than a certain predetermined current value. The predetermined current value is set according to the features of the power storage unit 56. In the third embodiment, the power storage unit 56 is a lead-acid battery, and the predetermined value is set to 200 mA according to the features of the lead-acid battery.

The switch module 88" is configured for forbidding or allowing the power transmission from the first terminal 60 and the second terminal 62 to the power transmission unit 56. After the robot 50 detects the return conditions, the first main control unit 76" transmits the control signal to control the switch module 88" to be in the state of allowing power transmission from the first terminal 60 and the second terminal 62 to the power transmission unit 56. In the process that the dockings station 10 charges the robot 50, the first main control unit 76" transmits the control signals through the signal transmitting port TX1 to control the switch module 88" to be in the state of allowing or forbidding the power transmission from the first terminal 60 and the second terminal 62 to the power transmission unit 56 according to the charging current detected by the first current detection unit 80". Aiming at the functions of the switch module 88", the switch module 88" at least can be set as the combination of a driving circuit and a MOS tube or the combination of a driving circuit and a relay. As shown in FIG. 12, the combination of the driving circuit and the MOS tube is adopted in the third embodiment, wherein the MOS tube Q1 is located between the first terminal 60 and the positive electrode of the power storage unit 56; the driving circuit is located between the signal transmitting port TX1 and the MOS tube; and the driving circuit further comprises a resistor R2 and a resistor R3 for driving the MOS tube, a switch transistor Q2, and a resistor R4 for driving the switch transistor Q2. Usually, the microcontroller MCU transmits the low level signal through the signal transmitting port TX1 to switch off the switch transistor Q2 and then switch off the MOS tube Q1, thus preventing the control circuit from consuming the power of the power storage unit 56. Once receiving the signal for returning from the signal receiving port RX2 or RX3, the microcontroller MCU transmits a high level signal through the signal transmitting port TX1 to control the switch transistor Q2 to be switched on and then the MOS tube Q1 on, thereby allowing the power transmission from the first terminal 60 and the second terminal 62 to the power storage unit 56, namely allowing the docking station 10 to charge the robot 50. After charging is started, the first current detection unit 80" detects the charging current supplied by the first terminal 60 and the second terminal 62 to the power storage unit 56 at any time and transmits the detected signal to the microcontroller MCU through the signal receiving port RX1. Once detecting that the charging current is less than 200 mA, the first microcontroller MCU transmits the low level signal through the signal transmitting port TX1 to switch off the switch transistor Q2 and then switch off the MOS tube Q1, thereby terminating the power transmission from the first terminal 60 and the second terminal 62 to the power storage unit 56. The docking station 10 is terminated from charging the robot 50.

The rectifying circuit 72" is configured for adjusting the current direction of the first terminal 60 and the second terminal 62 to ensure that the current flowing in the rectifying unit 72" via either the first terminal 60 or the second terminal 62 always flows out from the positive electrode of the rectifying unit 72", thus ensuring that the current flowing into the robot 50 from either the first terminal 60 or the second terminal 62 reaches the positive electrode of the power storage unit 56 first and then flows out of the robot 50 via the negative electrode of the power storage unit 56 to charge the power storage unit 56. Based on the abovementioned function, the rectifying unit 72" is set as a full bridge rectifying circuit consisting of four diodes. As shown in FIG. 12, the positive ends of the diodes D1 and D2 are connected back to back; the connection node thereof composes the negative output end of the rectifying unit 72"; and the negative output end is electrically connected with the negative electrode of the power storage unit 56. The negative ends of the diodes D3 and D4 are connected back to back; the connection node thereof composes the positive output end of the rectifying unit 72"; and the positive output end is electrically connected with the negative electrode of the power storage unit 56. The negative end of the diode D1 is electrically connected with the positive end of the diode D3; the connection node thereof composes the positive input end of the rectifying unit 72"; and the positive input end is electrically connected with the first terminal 60. The negative end of the diode D2 is electrically connected with the positive end of the diode D4; the connection node thereof composes the negative input end of the rectifying unit 72"; and the negative input end is electrically connected with the second terminal 62. In the case that the current's positive electrode flows into the first terminal 60, then it will across the positive output end of the rectifying unit 72" via the diode D3 and further across the positive electrode of the power storage unit 56, then returns to the negative output end of the rectifying unit 72" via the negative electrode of the power storage unit 56, and next flows into the second terminal 62 via the diode D2, thus forming a circuit to charge the power storage unit 56. In the case that the current's positive electrode flows into the second terminal 62, then it will across the positive output end of the rectifying unit 72" via the diode D4 and further across the positive electrode of the power storage unit 56, then returns to the negative output end of the rectifying unit 72" via the negative electrode of the power storage unit 56, and next flows into the first terminal 60 via the diode D1, thus forming a circuit to charge the power storage unit 56. The positive electrode of the power supplied by the power supplying unit 20" is applied to the third terminal 16, while the negative electrode is applied to the fourth terminal 18. During docking, the electrical connection between the third terminal 16 and the second terminal 62 and the electrical connection between the fourth terminal 18 and the first terminal 60 may occur. In case of no rectifying unit 72", the power from the third terminal 16 and the terminal 18 is applied to the first terminal 60 and the second terminal 62 in a direction opposite to that in the normal case. The rectifying unit 72" can rectify the power applied in the opposite direction to ensure that the robot 50 is charged normally no matter the power is applied to the first terminal 60 and the second terminal 62 in any way, thus preventing damage to the internal components in the robot 50.

The specific structures, working modes and mutual influences of functional units included in the first circuit 58 are described in detail above. The following are detailed descriptions of the specific structures and working modes of the functional units included in the second circuit 14.

The second circuit 14 further comprises the power supplying unit 20". The power supplying unit 20" acquires power from the external AC power supply through the power wire 12, converts the power correspondingly and then transmits the converted power to the third terminal 16 and the fourth terminal 18. Usually, the power supplying unit 20" may be set as the combination of a switching power supply and a control circuit or the combination of a transformer and a control circuit. The power conversion efficiency of the switching power supply is higher than that of the transformer, so the combination of the switching power supply and the control circuit is adopted in the third embodiment. After the switching power supply converts the high voltage alternating current, the control circuit rectifies the low voltage alternating current and finally generates the low voltage direct current. Meanwhile, the control circuit controls the working state of the switching power supply and adjusts the output of the switching power supply according to the features of the charged power storage unit 56. In the third embodiment, the power storage unit 56 is a 24V lead-acid battery. The control circuit adjusts and controls the working mode of the switching power supply to be the current-and-voltage-limiting mode, wherein the voltage limiting value is set to 29.5V, and the current limiting value is set to 1.5 A. Based on the adjustment and control of the control circuit, the maximum power finally applied by the power supplying unit 20" to the third terminal 16 and the fourth terminal 18 is of the highest voltage, 29.5V, and the highest current, 1.5 A. The power supplying unit 20" is not provided with a power terminating unit, so the third terminal 16 and the fourth terminal 18 have a 29.5V DC power supply as long as the power wire 12 is electrically connected with the external AC power supply. The current flows across the first terminal 60 and the second terminal 62 and further into the power storage unit 56 once the first terminal 60 and the second terminal 62 are respectively in corresponding electrical connection with the third terminal 16 and the fourth terminal 18. Although the third terminal 16 and the fourth terminal 18 always have a power supply, the maximum voltage of the power supply is only 29.5V. Therefore, the power supply is safe and will not cause injury to human body.

The above are detailed descriptions of functions, specific structure and mutual influences of each of the functional units of the second circuit 14 and the first circuit 58 with reference to the circuit frame diagram. The following are the detailed descriptions of docking and charging between the robot 50 and the docking station 10 with reference to the workflow chart of the microcontroller MCU.

Figure 13:
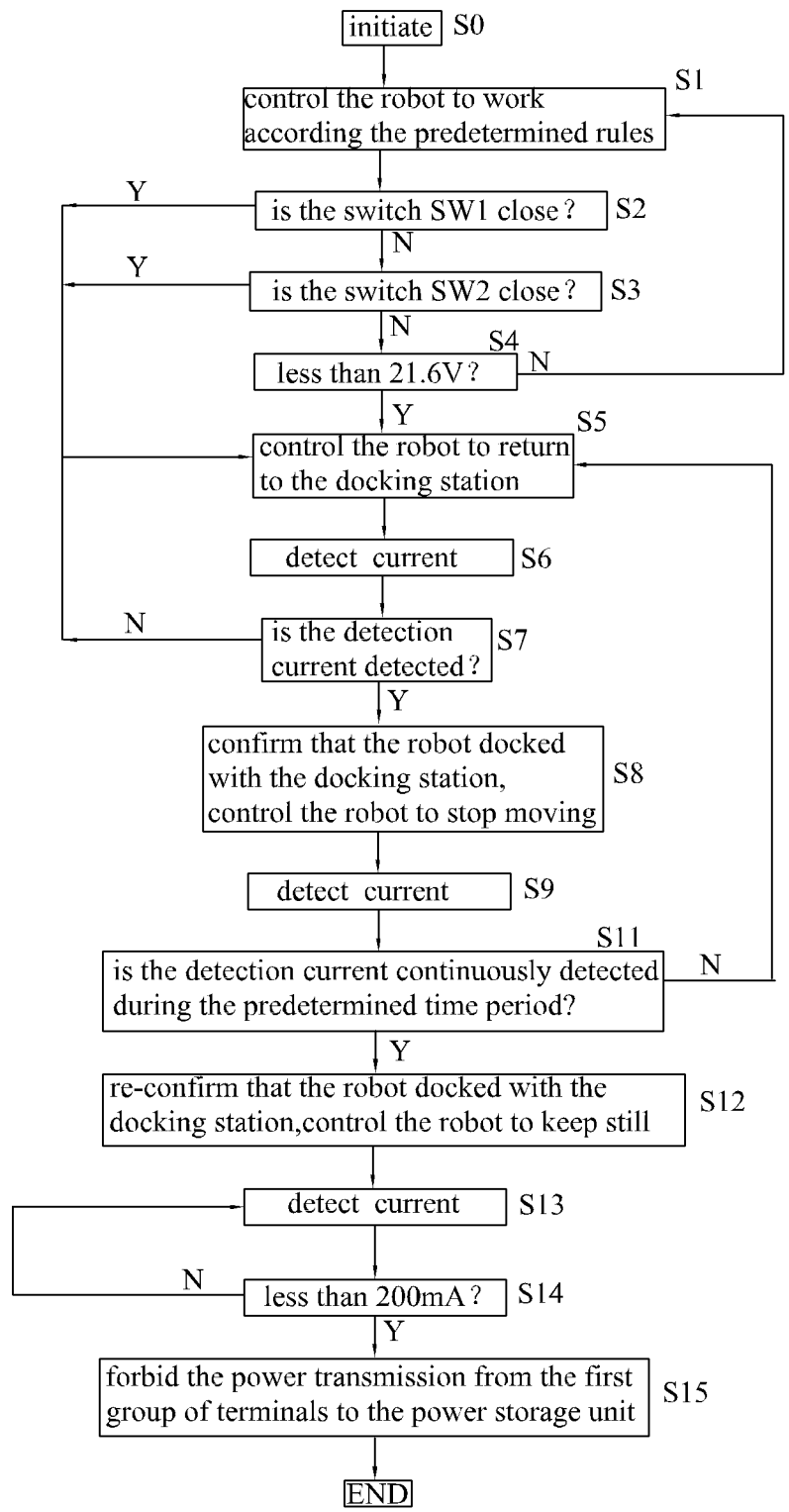
FIG. 13 is a workflow chart of the robot as shown in FIG. 12.

FIG. 13 shows the workflow chart of the microcontroller MCU. After the robot 50 is started to work, execute step S0: initiate. After initiating is completed, execute step S1: control the robot 50 to work according to the predetermined rules in the working area 102 defined by the boundary wire 100. Then, execute step S2: detects the state of the switch SW1, and judge if the user outputs the return instruction through the forced return assembly 90. If the judgment result is yes, turn to step S5. If the judgment result is no, execute step S3: detect the state of the switch SW2, and judges if the robot 50 is caught in the rain. If the judgment result is yes, turn to step S5. If the judgment result is no, execute step S4: detect if the voltage value of the power storage unit 56 is less than 21.6V by the storage power detection unit 82", namely if the current power level of the power storage unit 56 is less than the predetermined value. If the judgment result is no, return to step S1. If the judgment result is yes, execute step S5: control the robot 50 to return to the docking station 10 along the boundary wire 100 and the switch module 88" to be in the on state to allow the power transmission from the first terminal 60 and the second terminal 62 to the power storage unit 56. Then, execute step S6: detect the current transmitted from the first terminal 60 and the second terminal 62 to the power storage unit 56. Execute step S7: further judge whether the detection current is detected. If the judgment result is no, return to step S5. If the judgment result is yes, execute step S8. In step S8, the first main control unit 76" controls the robot 50 to stop moving after confirming that the first group of terminals of the robot 50 docked with the second group of terminals of the docking station 10. Execute step S9: continuously detect the current transmitted from the first terminal 60 and the second terminal 62 to the power storage unit 56. Execute step S11: judge if the detection current is continuously detected in the predetermined time period 2S. If the judgment result is no, this means that docking failed, then control the robot 50 to start moving, try to dock again, and return to step S5. If the judgment result is yes, execute step S12: re-confirm that the first group of terminals of the robot 50 docked with the second group of terminals of the docking station 10, and control the robot 50 keeping still, and the charging is started. The third terminal 16 and the fourth terminal 18 are respectively in corresponding electric connection with the first terminal 60 and the second terminal 62 after the first group of terminals of the robot 50 docked with the second group of terminals of the docking station 10. The power supplied by the power supplying unit 20" to the third terminal 16 and the fourth terminal 18 is transmitted by the first terminal 60 and the second terminal 62 to charge the power storage unit 56. During charging, the first current detection unit 80" continuously detects the current transmitted from the first terminal 60 and the second terminal 62 to charge the power storage unit 56, as shown in step S13. Execute step S14: judge if the current is less than 200 mA. If the judgment result is no, return to step S13 to continuously detect the current. If the judgment result is yes, execute step S15: control the switch module 88" to forbid the power transmission from the first terminal 60 and the second terminal 62 to charge the power storage unit 56. Charging is terminated, and then the whole docking and charging process ends. The robot 50 can return to the working area 102 again to work continuously.

In the present invention, the robot 50 may be a mower, dust collector, industrial robot, etc. As a mower, the robot 50 further comprises a cutting mechanism. The cutting mechanism includes a motor and blades. The motor drives the blades to rotate to cut the lawn when the mower works in the working area 102 defined by the boundary wire 100.

What is claimed is:

1. A docking system comprising:
    a first circuit located in a robot, the first circuit comprising a power storage unit for supplying power to the robot and a first main control unit for controlling the movement of the robot;
    a first group of terminals electrically connected with the first circuit;
    a second circuit located in a docking station, the second circuit comprising a power supplying unit; and
    a second group of terminals electrically connected with the second circuit, the power storage unit or the power supplying unit providing a detection power, the detection power generating a detection current when it flows across a detection circuit, the detection circuit being constructed by the first circuit and the second circuit through the first group of terminals docking with the second group of terminals;
    wherein the detection circuit further comprises a current detection unit, and the first main control unit confirms that the first group of terminals dock with the second group of terminals when the detection current is detected by the current detection unit.

2. The docking system according to claim 1, wherein the detection power is provided by the power supplying unit.

3. The docking system according to claim 2, wherein the power provided by the supplying unit is a charging power, and the detection power is equal to the charging power.

4. The docking system according to claim 2, wherein the power provided by the power supplying unit is a non-charging power, and the detection power is equal to the non-charging power.

5. The docking system according to claim 1, wherein the detection power is provided by the power storage unit, a non-charging power is provided by the power supplying unit, and the detection power is higher than the non-charging power.

6. The docking system according to claim 1, wherein the second circuit further comprises a second main control unit, and the second main control unit confirms that the first group of terminals dock with the second group of terminals when the detection current is detected by the current detection unit.

7. The docking system according to claim 6, wherein the second main control unit controls the power supplying unit to output a charging power after the first group of terminals dock with the second group of terminals.

8. The docking system according to claim 6, wherein the second main control unit controls the power supplying unit to output a charging power if the detection current is detected by the current detection unit again during a predetermined period after the first group of terminals dock with the second group of terminals.

9. The docking system according to claim 4, wherein the first circuit further comprises a switch module, and the first main control unit controls the switch module to isolate the power storage unit from the other part of the detection circuit if the detection current is not detected by the current detection unit.

10. The docking system according to claim 1, wherein the first main control unit controls the robot to stop after the first group of terminals dock with the second group of terminals.

11. The docking system according to claim 10, wherein the first main control unit controls the robot to move if the detection current is not detected by the current detection again during a predetermined period after the robot stops.

12. A docking method for a robot to dock with a docking station,
    the robot comprising:
    a first group of terminals; and
    a first circuit electrically connected with the first group of terminals, the first circuit comprising a power storage unit for supplying power to the robot and a first main control unit for controlling the movement of the robot;
    the docking station comprising:
    a second group of terminals operable to electrically connect with the first group of terminals respectively; and
    a second circuit electrically connected with the first group of terminals, the second circuit comprising a power supplying unit;
    the power storage unit or the power supplying unit providing a detection power, the detection power generating a detection current when it flows across a detection circuit, the detection circuit constructed by the first circuit and the second circuit through the first group of terminals docking with the second group of terminals, the detection circuit further comprising a current detection unit;

the docking method comprising the following steps:
the current detection unit detecting a current in the detection circuit;
the first main control unit confirming whether the detection current is detected by the current detection unit;
the detection current being detected by the current detection unit;
the first main control unit confirming that the first group of terminals dock with the second group of terminals when the detection current is detected by the current detection unit.

13. The docking method according to claim 12, wherein a detection power is provided by the power supplying unit, the detection power is a charging power.

14. The docking method according to claim 12, wherein the first main control unit controls the robot to stop after the first group of terminals dock with the second group of terminals.

15. The docking method according to claim 14, wherein the first main control unit controls the robot to move if the detection current is not detected by the current detection unit again during a predetermined period after the robot stops.

16. A robot operable to dock with a docking station and obtain power from the docking station,
the robot comprising:
a first group of terminals;
a first circuit electrically connected with the first group of terminals, the first circuit comprising a power storage unit for supplying power to the robot and a first main control unit for controlling the movement of the robot;
the docking station comprising:
a second group of terminals operable to electrically connect with the first group of terminals respectively;
a second circuit electrically connected with the first group of terminals, the second circuit comprising a power supplying unit;
the power storage unit or the power supplying unit providing a detection power, the detection power generating a detection current when it flows across a detection circuit, the detection circuit constructed by the first circuit and the second circuit through the first group of terminals docking with the second group of terminals;
wherein the detection circuit further comprises a current detection unit, and the first main control unit confirms that the first group of terminals docks with the second group of terminals when the detection current is detected by the current detection unit.

17. The robot according to claim 16, wherein the current detection unit is disposed in the first circuit.

18. The robot according to claim 16, wherein the power provided by the power supplying unit is a detection power, the detection power is a charging power.

19. The robot according to claim 16, wherein the first main control unit controls the robot to stop after the first group of terminals dock with the second group of terminals.

20. The robot according to claim 19, wherein the first main control unit controls the robot to move if the detection current is not detected by the current detection unit again during a predetermined period after the robot stops.

* * * * *